US012424396B2

(12) United States Patent
Konno

(10) Patent No.: US 12,424,396 B2
(45) Date of Patent: Sep. 23, 2025

(54) INPUT DEVICE

(71) Applicant: ALPS ALPINE CO., LTD., Tokyo (JP)

(72) Inventor: Satoru Konno, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 170 days.

(21) Appl. No.: 18/306,501

(22) Filed: Apr. 25, 2023

(65) Prior Publication Data

US 2023/0420195 A1 Dec. 28, 2023

(30) Foreign Application Priority Data

Jun. 28, 2022 (JP) ................................ 2022-104040

(51) Int. Cl.
*H01H 9/04* (2006.01)
*H01H 19/14* (2006.01)

(52) U.S. Cl.
CPC .............. *H01H 9/04* (2013.01); *H01H 19/14* (2013.01)

(58) Field of Classification Search
CPC .......... H01H 9/04; H01H 19/14; H01H 23/30; H01H 23/06; H01H 23/02
See application file for complete search history.

(56) References Cited

U.S. PATENT DOCUMENTS

| | | | | |
|---|---|---|---|---|
| 5,876,243 | A * | 3/1999 | Sangawa | H01H 9/04 200/51 R |
| 7,183,510 | B2 * | 2/2007 | Ami | G05G 25/04 200/339 |
| 7,294,800 | B2 * | 11/2007 | Koyama | H01H 21/08 200/302.1 |
| 7,294,801 | B2 * | 11/2007 | Shimizu | H01H 23/06 200/302.1 |

FOREIGN PATENT DOCUMENTS

| | | |
|---|---|---|
| JP | 2007-305414 | 11/2007 |

* cited by examiner

*Primary Examiner* — Lheiren Mae A Caroc
(74) *Attorney, Agent, or Firm* — IPUSA, PLLC

(57) ABSTRACT

An input device includes a substrate, a case configured to accommodate the substrate, an operation knob swingably engaged to the case and operated by an operator, and a panel member having an opening allowing swing of the operation knob, at least a part of the opening being closed by the operation knob. The operation knob includes a swing end formed at a predetermined distance from a rotation axis that serves as a rotation center. The panel member includes a fixed end that defines one end of the opening and that faces the swing end in a neutral state in which no operation is performed, and a gap is formed between those ends. The case includes a protrusion, and at least a part of the protrusion overlaps the gap when viewed from a first direction perpendicular to the substrate in the neutral state in plan view.

11 Claims, 25 Drawing Sheets

100

100

100

INPUT DEVICE

CROSS-REFERENCE TO RELATED APPLICATION

The present application claims priority under 35 U.S.C. § 119 to Japanese Patent Application No. 2022-104040, filed on Jun. 28, 2022, the contents of which are incorporated herein by reference in their entirety.

BACKGROUND

1. Field of the Invention

The present disclosure relates to an input device.

2. Description of the Related Art

Japanese Unexamined Patent Application Publication No. 2007-305414, which is referred to as Patent Document 1, discloses a configuration of a switch device including an operation knob provided in an opening of a case and swingably supported by the case, and a cover that closes a part of the opening of the case. Further, a technique for preventing foreign matter from remaining in a recess of a cover by providing a plurality of holes therein is disclosed.

RELATED-ART DOCUMENT

Patent Document

[Patent Document 1] Japanese Unexamined Patent Application Publication No. 2007-305414

In the switch device disclosed in Patent Document 1, when large-diameter foreign matter having a flat shape, such as a coin, falls from a gap between the operation knob and the cover, there is a risk that the foreign matter may be caught therebetween in a manner that is difficult to remove. As a result, the swing of the operation knob may be hindered, and it may become difficult to perform input operation.

SUMMARY

An input device according to an embodiment includes a substrate, a case accommodating the substrate, an operation knob swingably engaged to the case and operated by an operator, and a panel member having an opening allowing swing of the operation knob, at least a part of the opening being closed by the operation knob. The operation knob includes a swing end formed at a predetermined distance from a rotation axis that serves as a rotation center, when the operation knob is swung. The panel member includes a fixed end that defines one end of the opening and that faces the swing end of the operation knob in a neutral state in which no operation is performed. The swing end and the fixed end form a gap therebetween. The case includes a protrusion that protrudes toward the gap on a lower side of the gap, and at least a part of the protrusion overlaps the gap when viewed from a first direction perpendicular to the substrate in the neutral state in plan view.

DESCRIPTION OF ONE EMBODIMENT

Hereinafter, one or more embodiments will be described with reference to the drawings. In the following description, for convenience, the X-axis direction is the front-rear direction, the Y-axis direction is the left-right direction, and the Z-axis direction is the up-down direction. Further, the X-axis positive direction is the forward direction, the Y-axis positive direction is the rightward direction, and the Z-axis positive direction is the upward direction.

Outline of Input Device 100

Figure 1:
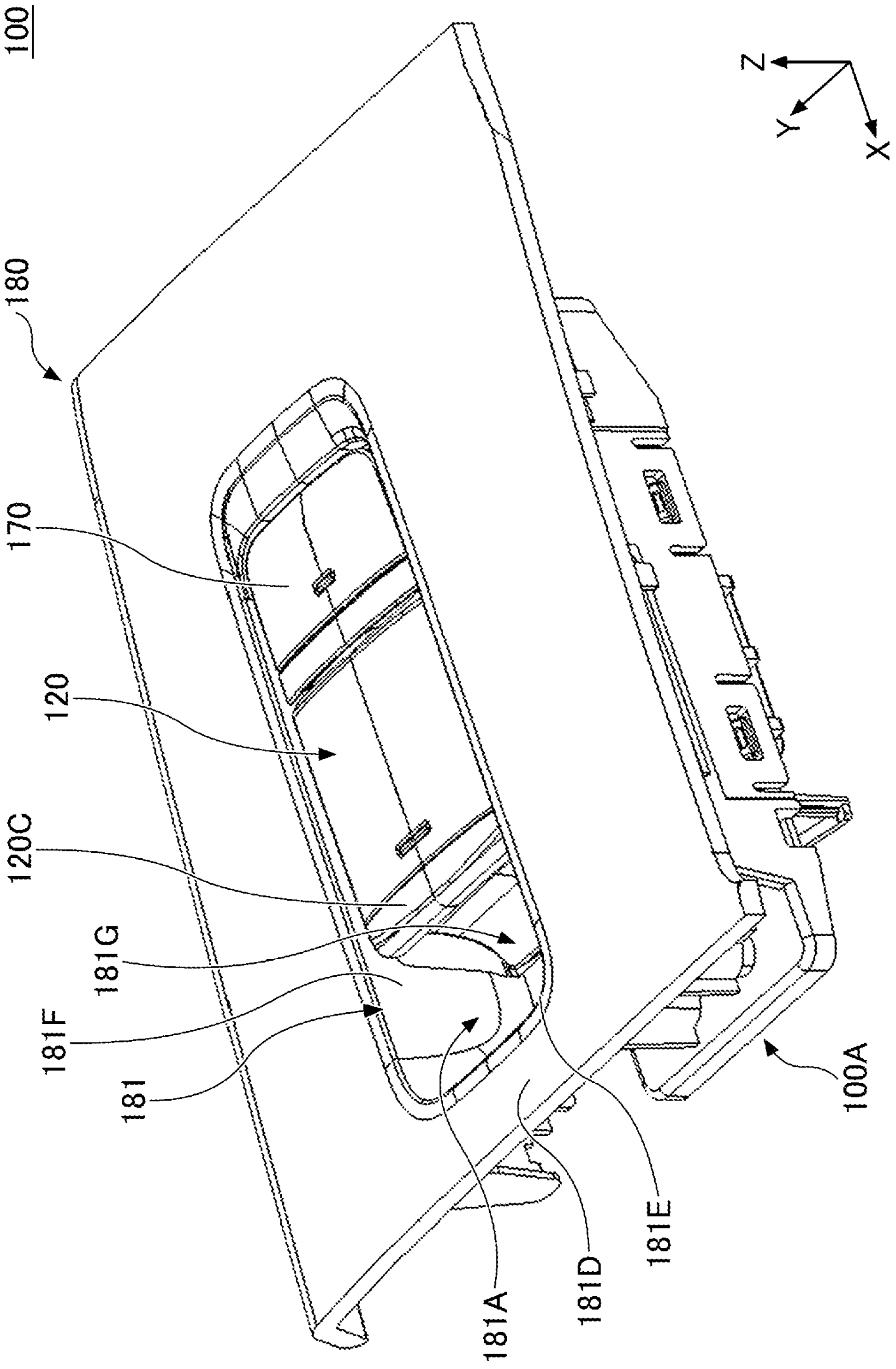
FIG. 1 is an external perspective view of an input device according to one embodiment.
Figure 2:
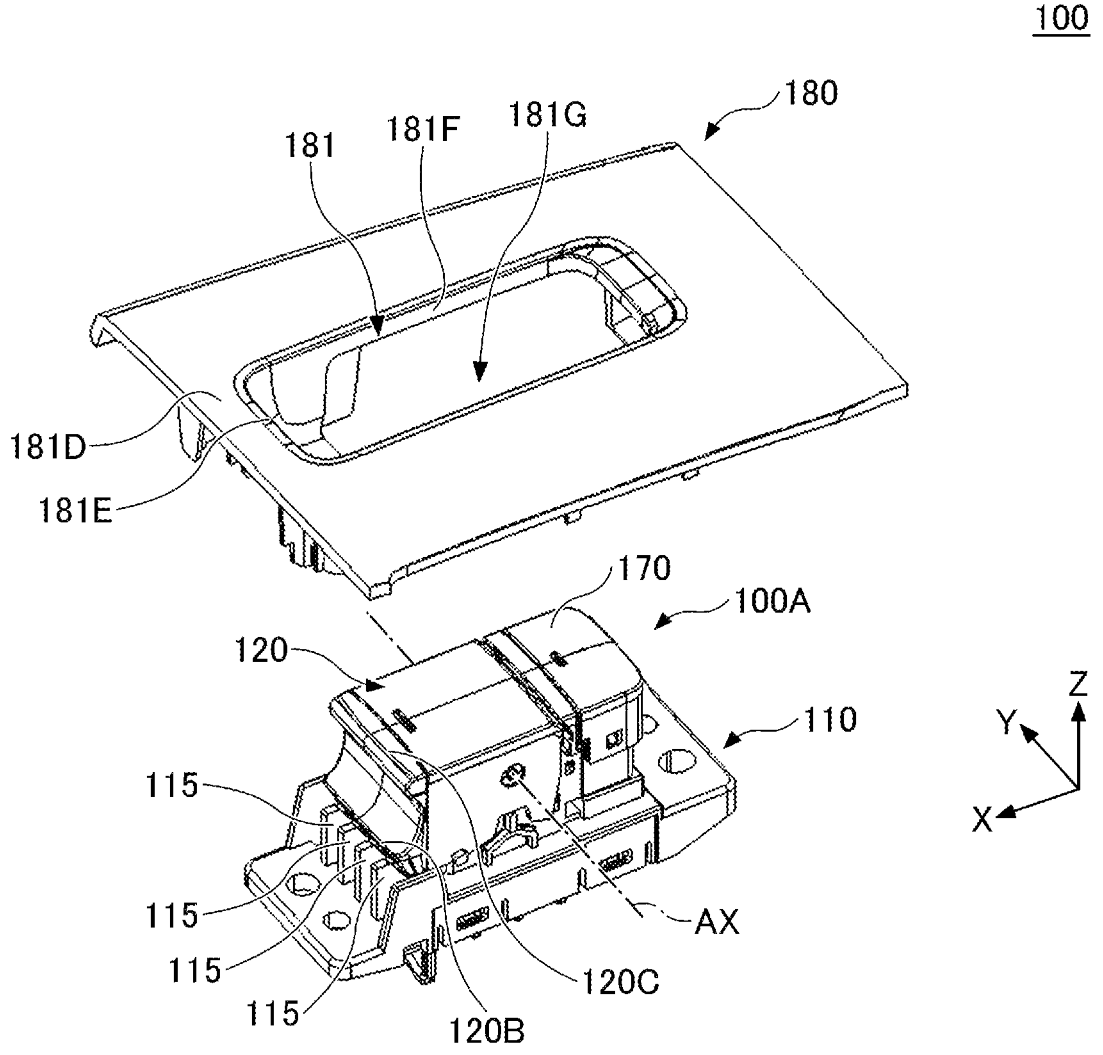
FIG. 2 is an exploded perspective view of the input device according to one embodiment.

FIG. 1 is an external perspective view of an input device 100 according to one embodiment. FIG. 2 is an exploded perspective view of the input device 100 according to one embodiment.

The input device 100 shown in FIGS. 1 and 2 is installed in a vehicle such as an automobile, and can be used as an input device for operating an electrically driven in-vehicle device (for example, an electric parking brake).

The input device 100 includes a mechanism for preventing an operation knob 120 from being stuck due to the entry of solid foreign matter into the device, and a waterproof mechanism. In the present embodiment, large-diameter foreign matter FS1, tablet-type foreign matter FS2, and liquid-type foreign matter FS3 are assumed as the foreign matter to be addressed. A coin is specifically assumed as the large-diameter foreign matter FS1. As the tablet-type foreign matter FS2, tablet-type solid confectionery such as FRISK (registered trade mark), in which a large quantity of small-tablet pieces is packed and sold, is specifically assumed. As the liquid-type foreign matter FS3, a lot of juice is specifically assumed. The term "coin" as used herein refers to a coin that is currently distributed in a large amount in the market. As used herein, coins refer to one-yen coins (20.0 mm diameter, 1.5 mm thick), one-cent coins (19.05 mm diameter, 1.55 mm thick), one-cent-euro coins (16.25 mm diameter, 1.67 mm thick), and one-yuan coins (25 mm diameter, 1.85 mm thick). Note that the term "one-yuan coin" as used herein refers to a fourth edition coin issued after 2000.

As shown in FIGS. 1 and 2, the input device 100 includes a switch unit 100A and a console panel 180.

The console panel 180 is an example of a "panel member". The console panel 180 is a member constituting a console at a driver's seat of a vehicle. In the present embodiment, the console panel 180 constitutes a center console disposed on the front center side of the vehicle interior space. The console panel 180 is a member formed by molding a synthetic resin, and includes a flat plate portion 181D having a flat plate shape parallel to the X-Y plane. A rectangular opening 181 whose longitudinal direction is the X-axis direction in a plan view viewed from above (Z-axis positive direction) is formed in a flat plate portion 181D of the console panel 180. In the present embodiment, the opening 181 and four rectangular corners formed by an end portion 181E of the flat plate portion 181D constituting the opening 181 are chamfered and rounded. Further, the console panel 180 includes a wall portion 181F extending downward from the end portion 181E of the flat plate portion 181D constituting the opening 181. Furthermore, the console panel 180 includes, on the front side of the wall portion 181F, a bottom wall portion 181B that is formed to be substantially parallel to the X-Y plane by curving a tip side extending downward from the end portion 181E. A rear end portion (fixed end 181C) of the bottom wall portion 181B of the console panel 180 is formed in the direction parallel to the Y-Z plane direction. The console panel 180 includes an opening 181G formed by the fixed end 181C and the lower end part of the wall portion 181F. The opening 181G is a hole formed through the console panel 180 in the up-down direction. The opening 181G is an example of an "opening".

The switch unit 100A includes a case 110 disposed below the console panel 180 (in the Z-axis negative direction) and relatively fixed thereto, and the operation knob 120 disposed above the case 110 (in the Z-axis positive direction) and swingably engaged thereto. The switch unit 100A also includes a second operation knob 170 disposed above the case 110 (in the Z-axis positive direction) and slidably engaged thereto in the up-down direction. As shown in FIG. 1, the switch unit 100A is incorporated in the console panel 180 in such a manner that at least a part of the upper side of the operation knob 120 and at least a part of the upper side of the second operation knob 170 protrude above the opening 181G. The opening 181 and the opening 181G are formed to have dimensions that allow the operation knob 120 to be swung. The opening 181G is closed by the operation knob 120 and the second operation knob 170. The upper end portion of the operation knob 120 and the upper end portion of the second operation knob 170 have a planar shape, and in a neutral state in which no operation is performed, these end portions are disposed to align with a plane formed by the flat plate portion 181D of the console panel 180.

As shown in FIG. 1, an operation portion 120C for receiving input operation from an operator is formed at the end portion of the upper-front side of the operation knob 120. The operation knob 120 is disposed near the center in the front-rear direction (the X-axis direction) inside the opening 181. An insertion space 181A is formed, into which the operator can insert his/her finger from above the opening 181 and touch the operation portion 120C, in the front side of the operation knob 120 (in the X-axis positive direction) inside the opening 181 and the upper side of the bottom wall portion 181B of the console panel 180.

For example, the switch unit 100A generates a detection signal when the operation knob 120 is operated, and transmits the detection signal to a driving unit (not illustrated) of the electric parking brake provided separately from the input device 100. The parking brake of the vehicle is operated (locked or released) by driving the driving unit that has received the detection signal.

The switch unit 100A includes the second operation knob 170 on the inner side of the opening 181G and on the rear side (X-axis negative side) of the operation knob 120. The second operation knob 170 is supported by the case 110 to be movable in the up-down direction (Z-axis direction), and can be pressed by the operator.

For example, when the second operation knob 170 is pressed, the switch unit 100A generates a second detection signal and transmits the second detection signal to the driving unit of the electric parking brake. The driving unit that has received the second detection signal switches an auto-hold function of the parking brake of the vehicle to ON or OFF.

Figure 3:
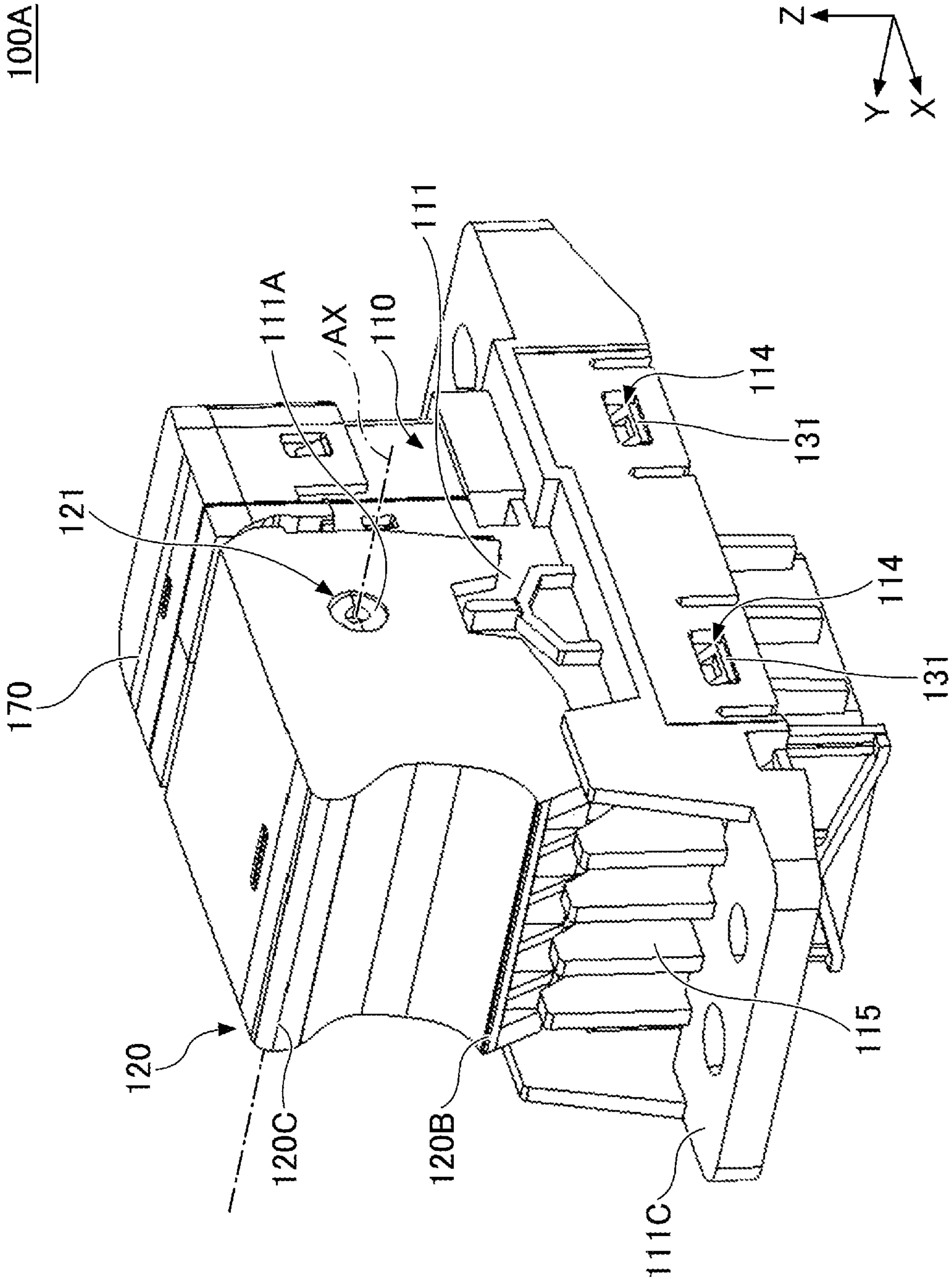
FIG. 3 is an external perspective view of a switch unit included in the input device according to one embodiment.
Figure 4:
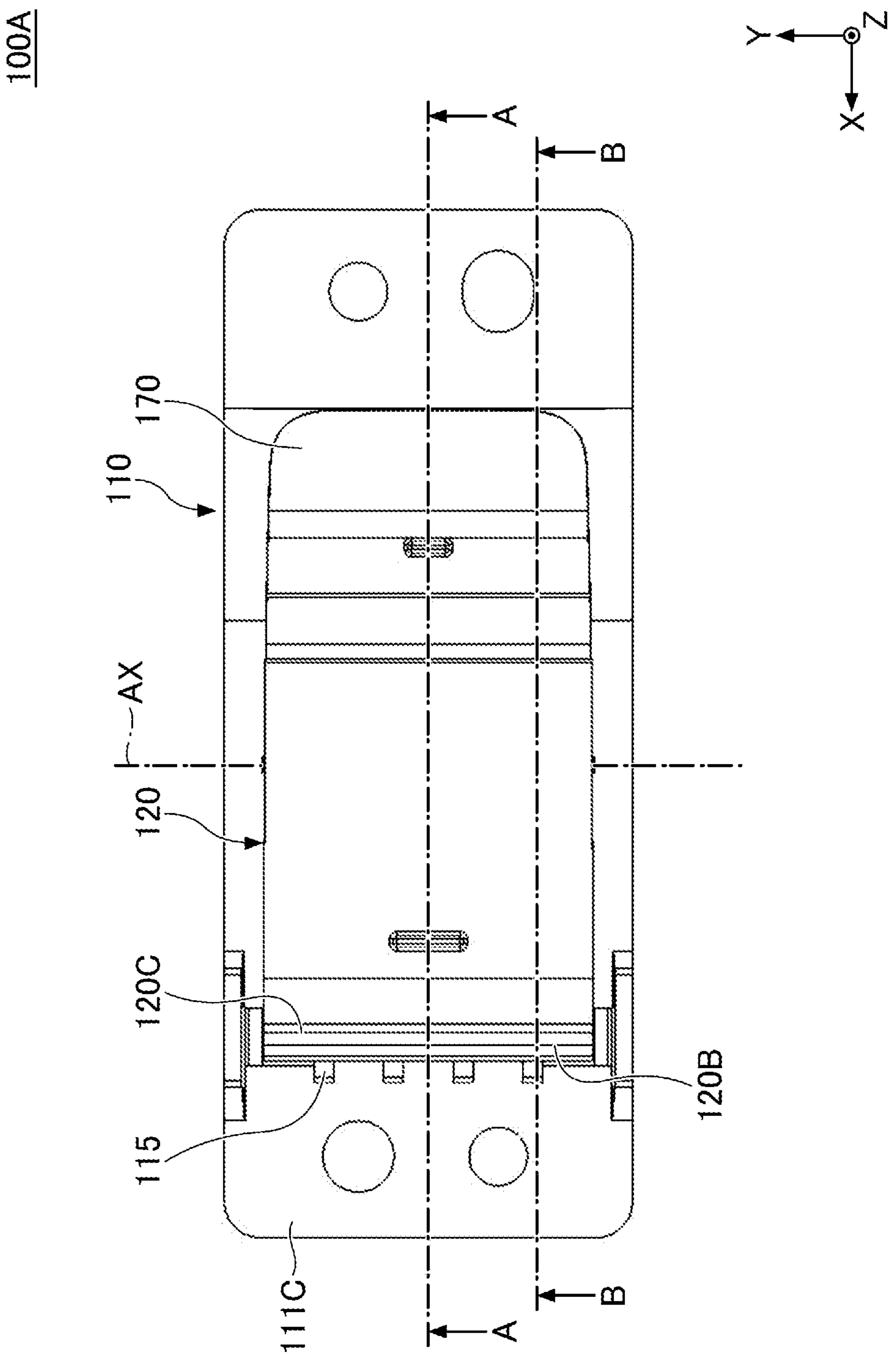
FIG. 4 is a plan view of the switch unit included in the input device according to one embodiment.
Figure 5:
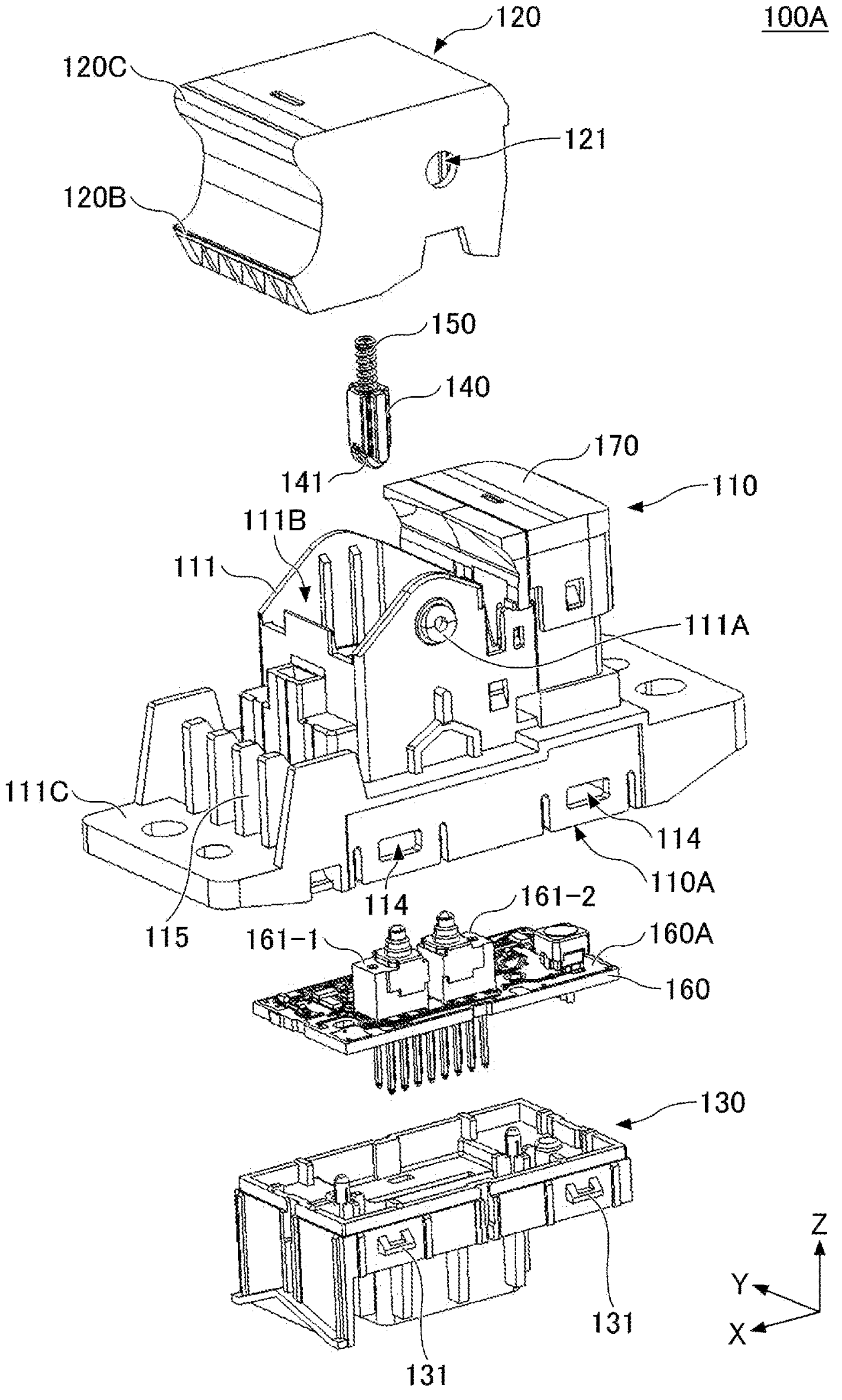
FIG. 5 is an exploded perspective view of the switch unit included in the input device according to one embodiment.
Figure 6:
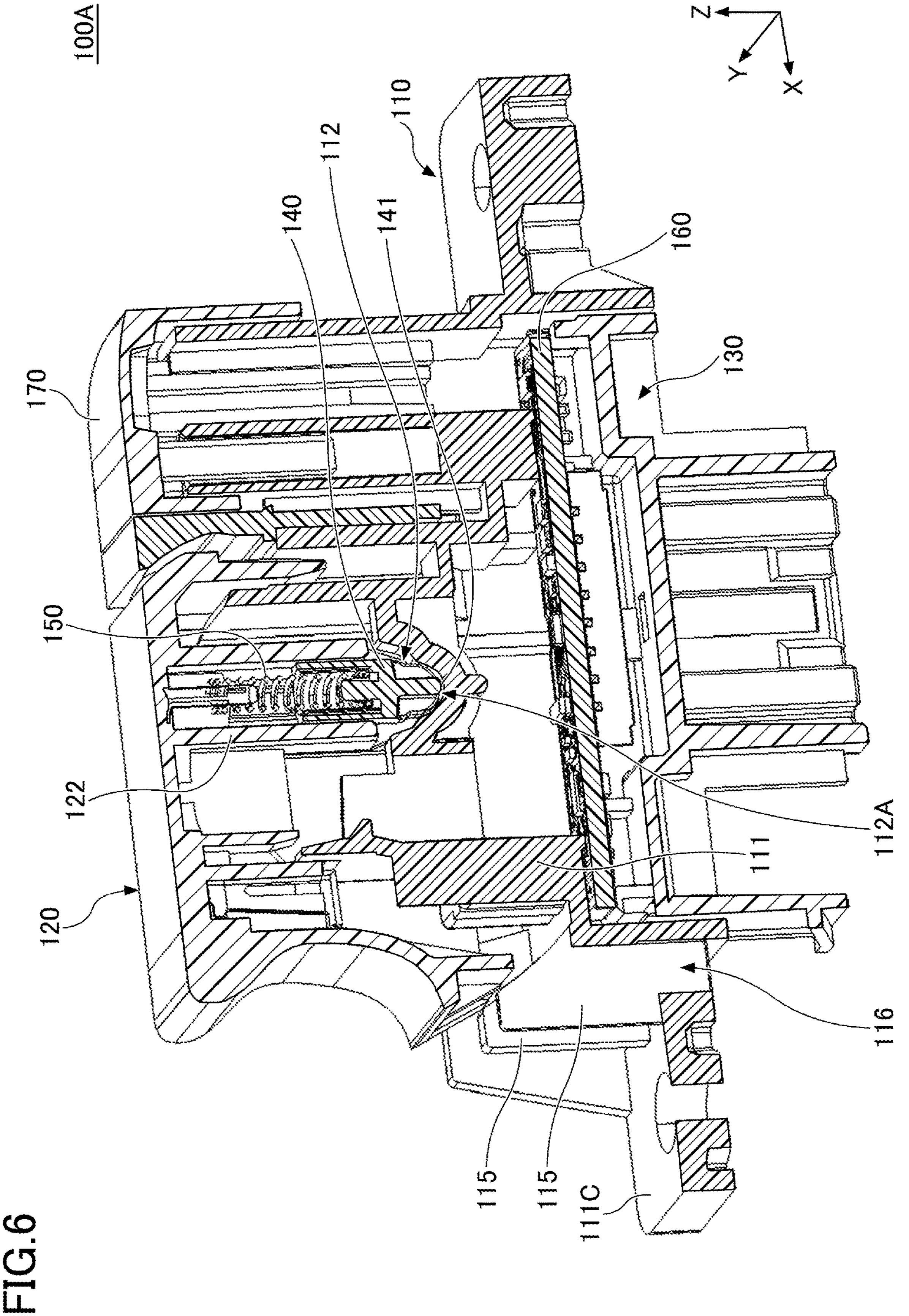
FIG. 6 is a perspective cross-sectional view of the switch unit included in the input device according to one embodiment taken along a cross-sectional line A-A shown in FIG. 4.
Figure 7:
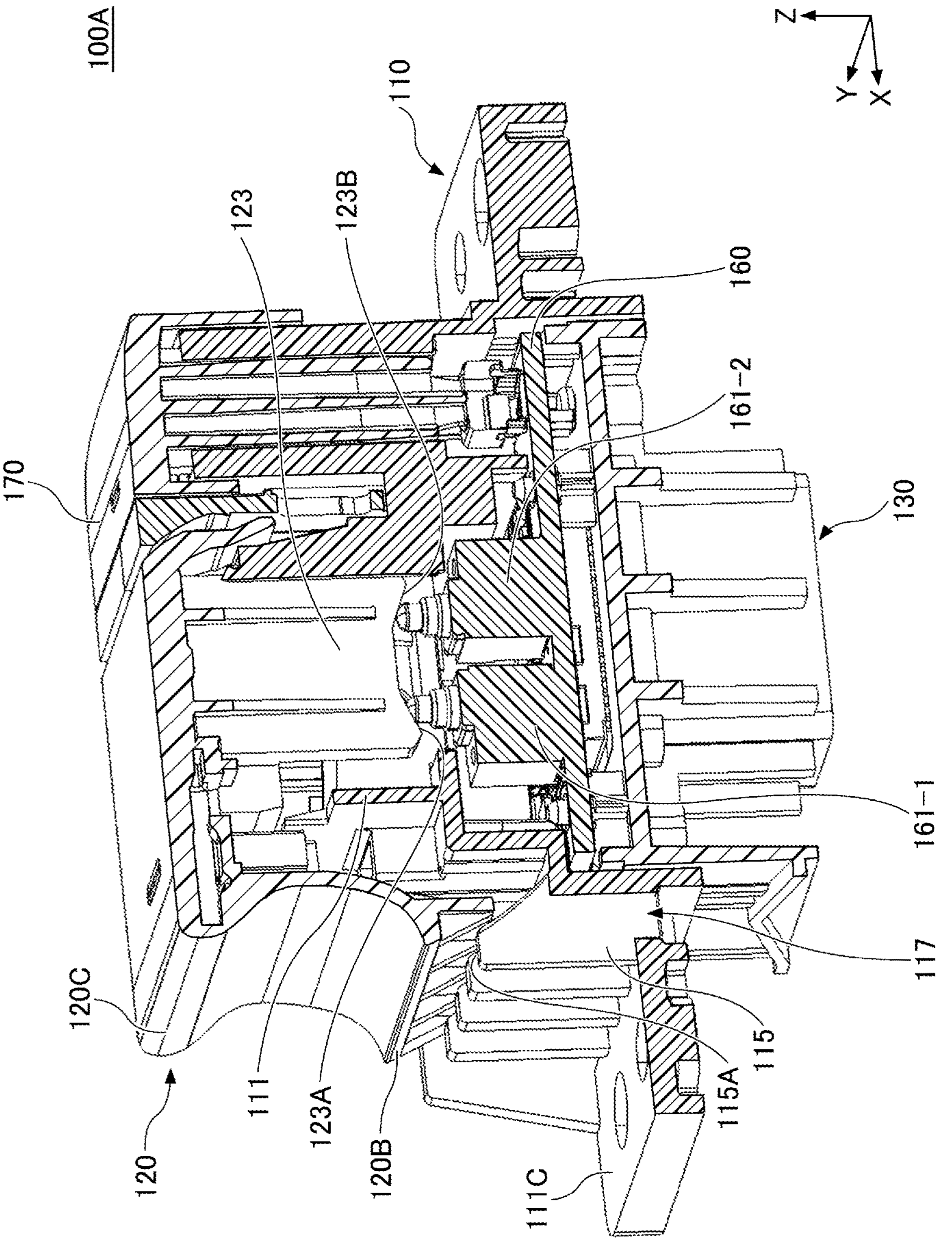
FIG. 7 is a perspective cross-sectional view of the switch unit included in the input device according to one embodiment taken along a cross-sectional line B-B shown in FIG. 4.
Figure 8:
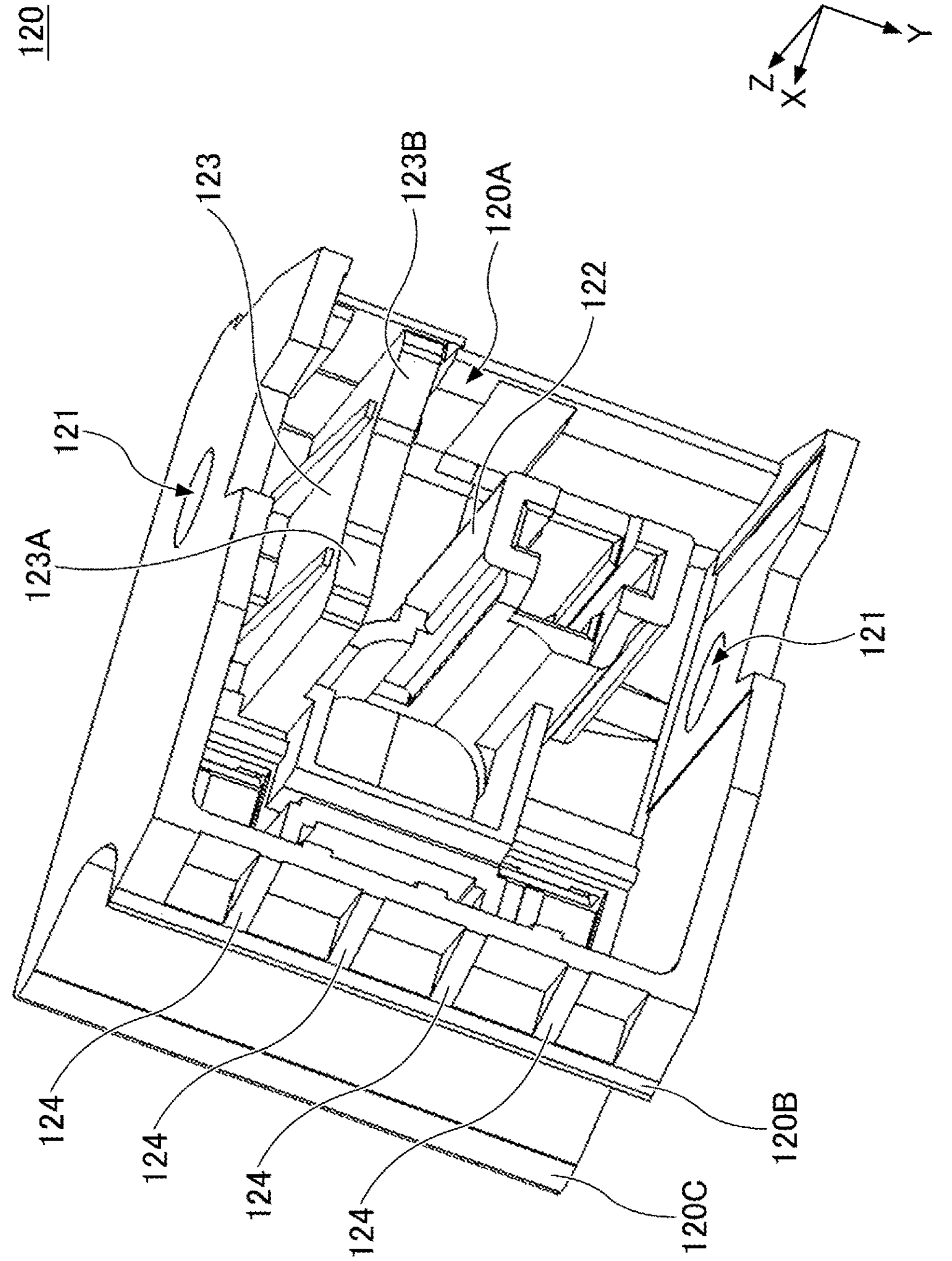
FIG. 8 is an external perspective view of an operation knob included in the switch unit of the input device according to one embodiment.

(Configuration of Switch Unit 100A) FIG. 3 is an external perspective view of the switch unit 100A included in the input device 100 according to one embodiment. FIG. 4 is a plan view of the switch unit 100A included in the input device 100 according to one embodiment. FIG. 5 is an exploded perspective view of the switch unit 100A included in the input device 100 according to one embodiment. FIG. 6 is a perspective cross-sectional view of the switch unit 100A included in the input device 100 according to one embodiment taken along the cross-sectional line A-A shown in FIG. 4. FIG. 7 is a perspective cross-sectional view of the switch unit 100A included in the input device 100 according to one embodiment taken along the cross-sectional line B-B shown in FIG. 4. FIG. 8 is an external perspective view of the operation knob 120 included in the switch unit 100A of the input device 100 according to one embodiment.

As shown in FIGS. 3 to 7, the switch unit 100A includes the operation knob 120, the case 110, an actuator 140, a coil spring 150, a substrate 160, a cover 130, and the second operation knob 170.

In FIG. 4, the second operation knob 170 is shown in a state of being incorporated in the case 110. Since the second operation knob 170 is as described with reference to FIGS. 1 and 2, the description thereof will be omitted.

(Operation Knob 120)

The operation knob 120 is a resin member, and is swung by receiving an operation force from the operator. As shown in FIG. 6, the operation knob 120 has a hollow structure with an open lower portion. The operation knob 120 is disposed above the case 110, and attached to the upper side (Z-axis positive side) of the case 110, thereby swingably supported with respect to the case 110. The operation knob 120 has a bearing hole 121 on each of the left-side and right-side surfaces of the knob and on a rotation axis AX serving as a rotation center. The operation knob 120 is supported to be rotatable back (X-axis negative direction) and forth (X-axis positive direction) about the rotation axis AX with respect to the case 110 by connecting the bearing holes 121 with a pair of respective cylindrical portions 111A provided on the rotation axis AX of the case 110. The operation knob 120 is an example of an “operation knob”.

In an internal space 120A of the operation knob 120, a cylindrical portion 122 having a square cylindrical shape perpendicular to the substrate 160 is provided to hang down from the ceiling surface of the internal space 120A. The actuator 140 and the coil spring 150 are disposed inside the cylindrical portion 122.

Further, in the internal space 120A of the operation knob 120, a plate portion 123 having a flat plate shape perpendicular to the substrate 160 is provided on the left side (Y-axis negative side) of the cylindrical portion 122 to hang down from the ceiling surface of the internal space 120A.

A first pressing portion 123A is provided at the end portion on the front side (X-axis positive side) of the bottom surface of the plate portion 123. The first pressing portion 123A is in contact with the top portion of a push switch 161-1, and presses the push switch 161-1 when the operation knob 120 is swung forward (in the X-axis positive direction).

A second pressing portion 123B is provided at the end portion on the rear side (X-axis negative side) of the bottom surface of the plate portion 123. The second pressing portion 123B is in contact with the top portion of a push switch 161-2, and presses the push switch 161-2 when the operation knob 120 is swung rearward (in the X-axis negative direction).

(Case 110)

The case 110 is a container-shaped member having a hollow structure. The case 110 is a member made of synthetic resin. In the present embodiment, the case 110 is formed by injection molding. The substrate 160 is accommodated in the case 110. On the upper part of the case 110, a wall portion 111 having a substantially square cylindrical outer shape extending in the up-down direction is formed. On the lower part of the case 110, a plate-shaped base portion 111C extending forward from the lower part of the wall portion 111 and parallel to the X-Y plane direction is formed. The wall portion 111 has an upper opening 111B. The upper opening 111B is covered with the operation knob 120 after assembling. The wall portion 111 includes the pair of cylindrical portions 111A each provided protruding from left and right outer wall surfaces, on the rotation axis AX. The cylindrical portion 111A has a shape corresponding to the bearing hole 121 of the operation knob 120, and is provided at a position corresponding to the bearing hole 121 (that is, on the rotation axis AX). The wall portion 111 supports the operation knob 120 to be swingable in the front-rear direction (X-axis direction) by engaging the pair of cylindrical portions 111A with the pair of respective bearing holes 121. The operation knob 120 supported by the cylindrical portions 111A closes the upper opening 111B. The case 110 is an example of a “case”.

The case 110 has a cam groove 112 at the lower side of the cylindrical portion 122 of the operation knob 120 inside the wall portion 111. The cam groove 112 is a V shaped groove when viewed from the left-right direction (Y-axis direction), and has a bottom portion 112A at the central part thereof in the front-rear direction (X-axis direction).

(Actuator 140)

The actuator 140 is a columnar member made of resin and, disposed on the upper side (Z-axis positive side) of the cam groove 112 of the case 110 and in the cylindrical portion 122 of the operation knob 120 to be movable in the up-down direction (Z-axis direction). The actuator 140 is also disposed such that a curved tip portion 141 is facing down in the cylindrical portion 122. The tip portion 141 of the actuator 140 is pressed against the cam groove 112 (see FIG. 6) of the case 110 by the bias force from the coil spring 150. The tip portion 141 of the actuator 140 slides on the inclined surface of the cam groove 112 of the case 110 in accordance with the swing of the operation knob 120.

(Coil Spring 150)

The coil spring 150 is disposed on the upper side (Z-axis positive side) of the actuator 140 inside the cylindrical portion 122 provided in the operation knob 120, and biases the actuator 140 downward (Z-axis negative direction).

(Substrate 160)

The substrate 160 is a flat plate member made of hard resin. The substrate 160 is placed on the cover 130 inside the case 110, and is provided in parallel with the X-Y plane. As the substrate 160, for example, a printed wiring board (PWB) is used. The two push switches 161-1 and 161-2 are arranged side by side in the front-rear direction (X-axis direction) on an upper surface 160A of the substrate 160 and on the lower side of the plate portion 123 provided in the operation knob 120 with the push switch 161-1 on the front side (X-axis positive side). The substrate 160 is an example of a “substrate”.

(Cover 130)

The cover 130 is a resin-made member, and fitted into a lower opening 110A of the case 110 to close the lower opening 110A. The cover 130 has a substantially rectangular parallelepiped shape. The substrate 160 is placed on the cover 130. A plurality of engaging claws 131 are provided on each side surface of the cover 130. The cover 130 is fixed to the case 110 by engaging the plurality of engaging claws 131 with a plurality of corresponding openings 114 formed on the side surfaces of the case 110.

(Operation of Input Device 100)

When the operation knob 120 is not operated, the tip portion 141 of the actuator 140 is fitted into the bottom portion 112A of the V-shaped cam groove 112 provided in the case 110 by using the bias force from the coil spring 150. As a result, when the operation knob 120 is not operated, the operation knob 120 can be maintained in the neutral state.

When the operation knob 120 is operated, the actuator 140 is swung together with the operation knob 120. At this time, the tip portion 141 of the actuator 140 slides on the inclined surface of the cam groove 112 of the case 110 while being pressed against the inclined surface of the V-shaped cam groove 112 provided in the case 110 by the bias force from the coil spring 150.

Here, when the operation knob 120 is swung forward (in the X-axis positive direction), the first pressing portion 123A on the bottom surface of the plate portion 123 of the operation knob 120 presses the push switch 161-1. As a result, the push switch 161-1 is switched on and a detection signal is output.

On the other hand, when the operation knob 120 is swung rearward (in the X-axis negative direction), the second pressing portion 123B on the bottom surface of the plate portion 123 of the operation knob 120 presses the push switch 161-2. As a result, the push switch 161-2 is switched on and a detection signal is output.

Further, when the operation of the operation knob 120 is released, the tip portion 141 of the actuator 140 slides on the inclined surface of the cam groove 112 of the case 110 by using the bias force from the coil spring 150, and is again fitted into the bottom portion 112A of the cam groove 112 again. As a result, when the operation of the operation knob 120 is released, the operation knob 120 can be returned to the neutral state.

(Stuck Prevention Structure and Waterproof Structure)

Hereinafter, effects of a stuck prevention structure that prevents the input device 100 according to one embodiment from being stuck in a manner in which it is difficult to swing the operation knob 120 will be described with reference to FIGS. 9 to 17. Further, effects of a waterproof structure included in the input device 100 according to one embodiment will be described with reference to FIGS. 18 and 19. Furthermore, a positional relationship between protrusions 115 and ribs 124 of the input device 100 according to one embodiment and modified examples thereof will be described with reference to FIGS. 20 to 23.

Figure 9:
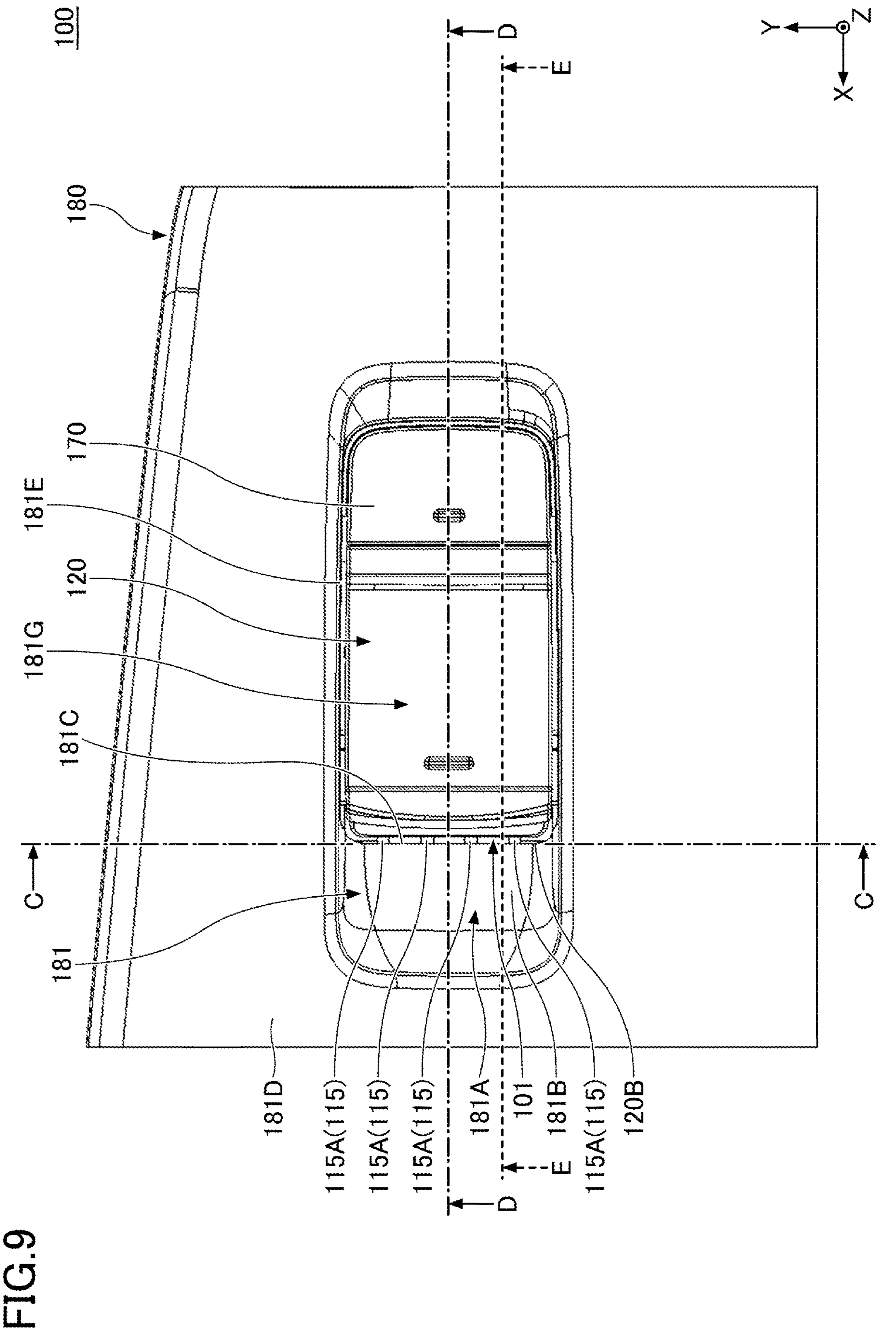
FIG. 9 is a plan view of the input device according to one embodiment.
Figure 10:
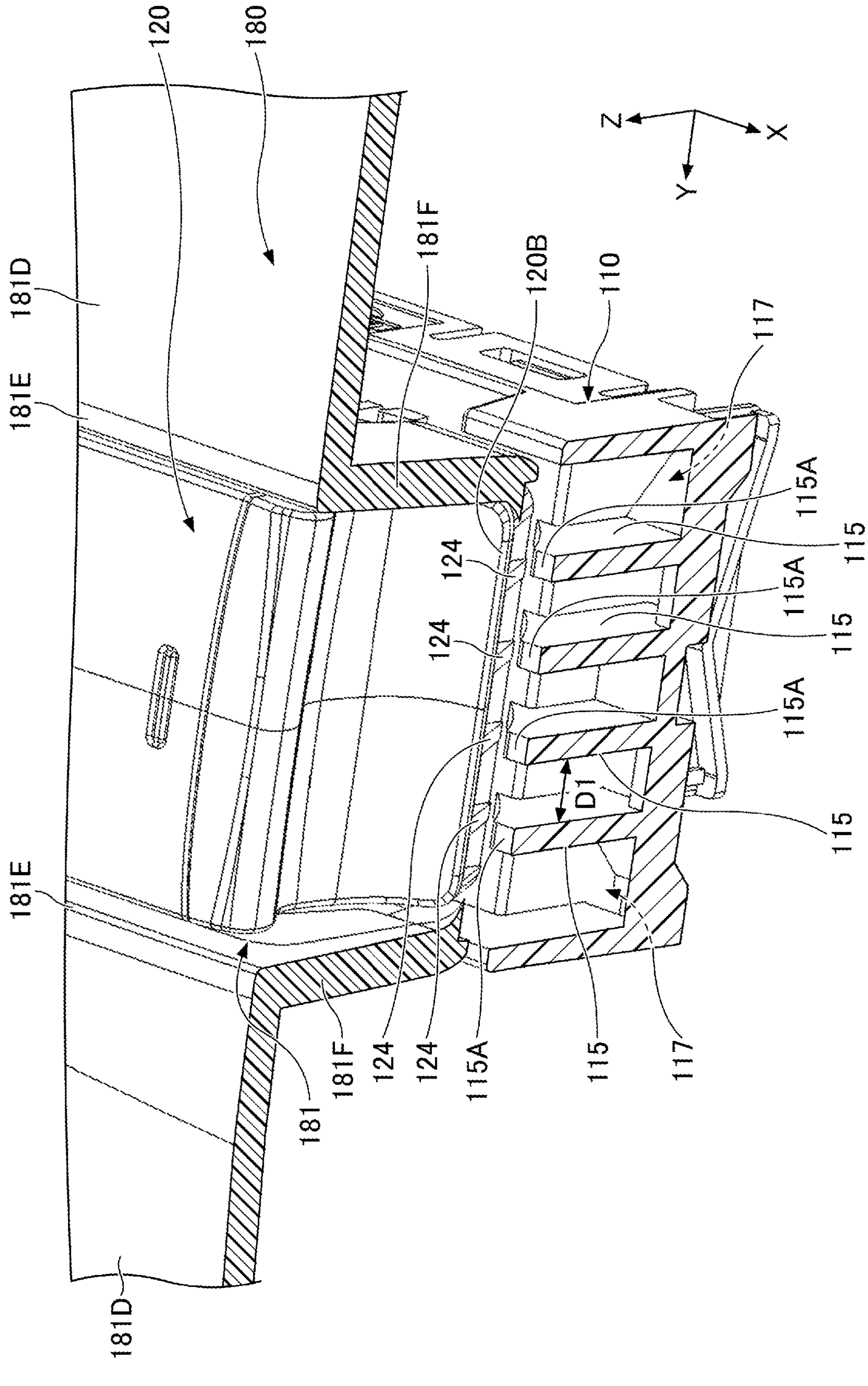
FIG. 10 is a perspective cross-sectional view of the input device according to one embodiment taken along a cross-sectional line C-C shown in FIG. 9.
Figure 11:
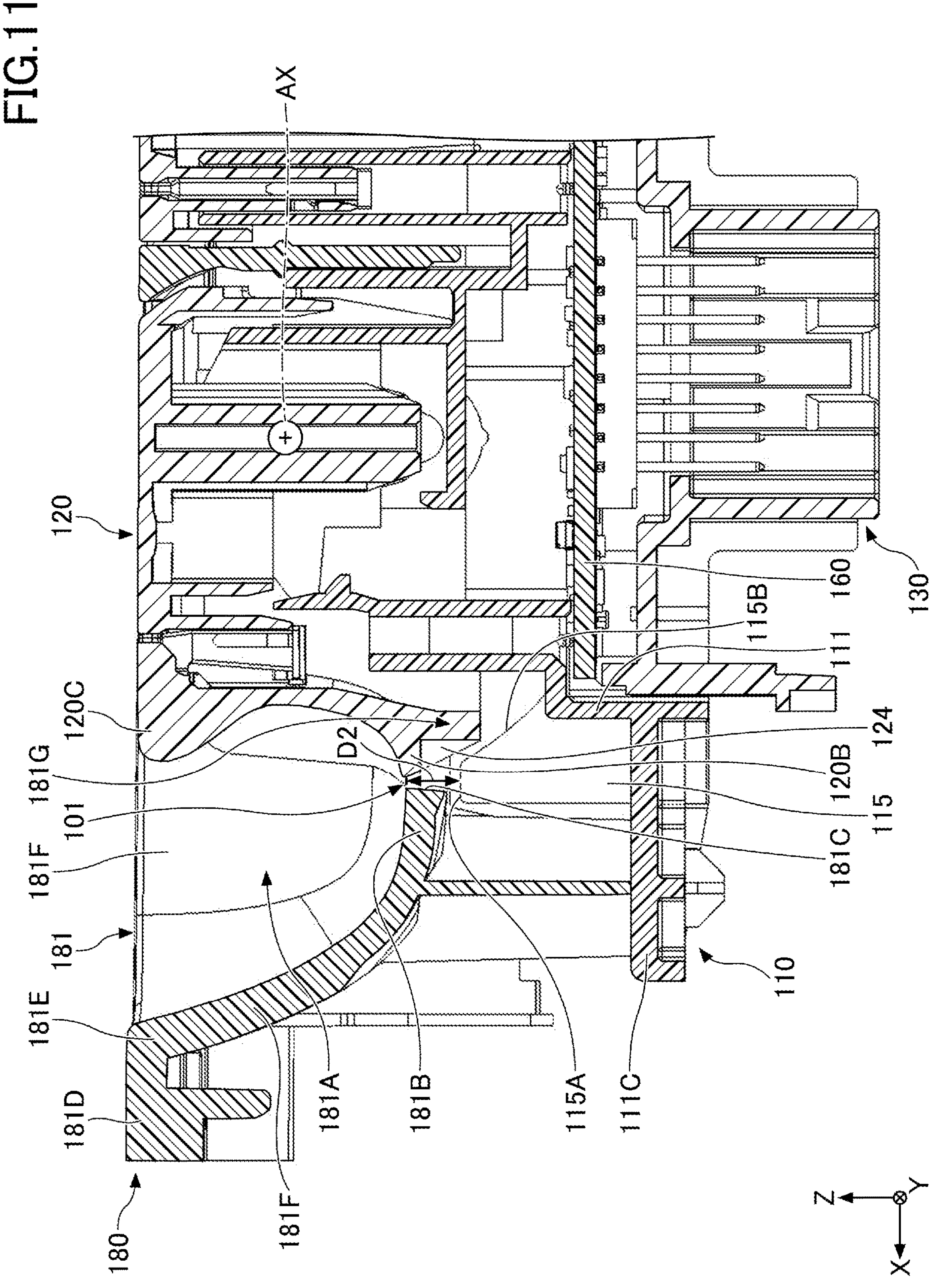
FIG. 11 is a cross-sectional view of the input device according to one embodiment taken along a cross-sectional line D-D shown in FIG. 9.
Figure 12:
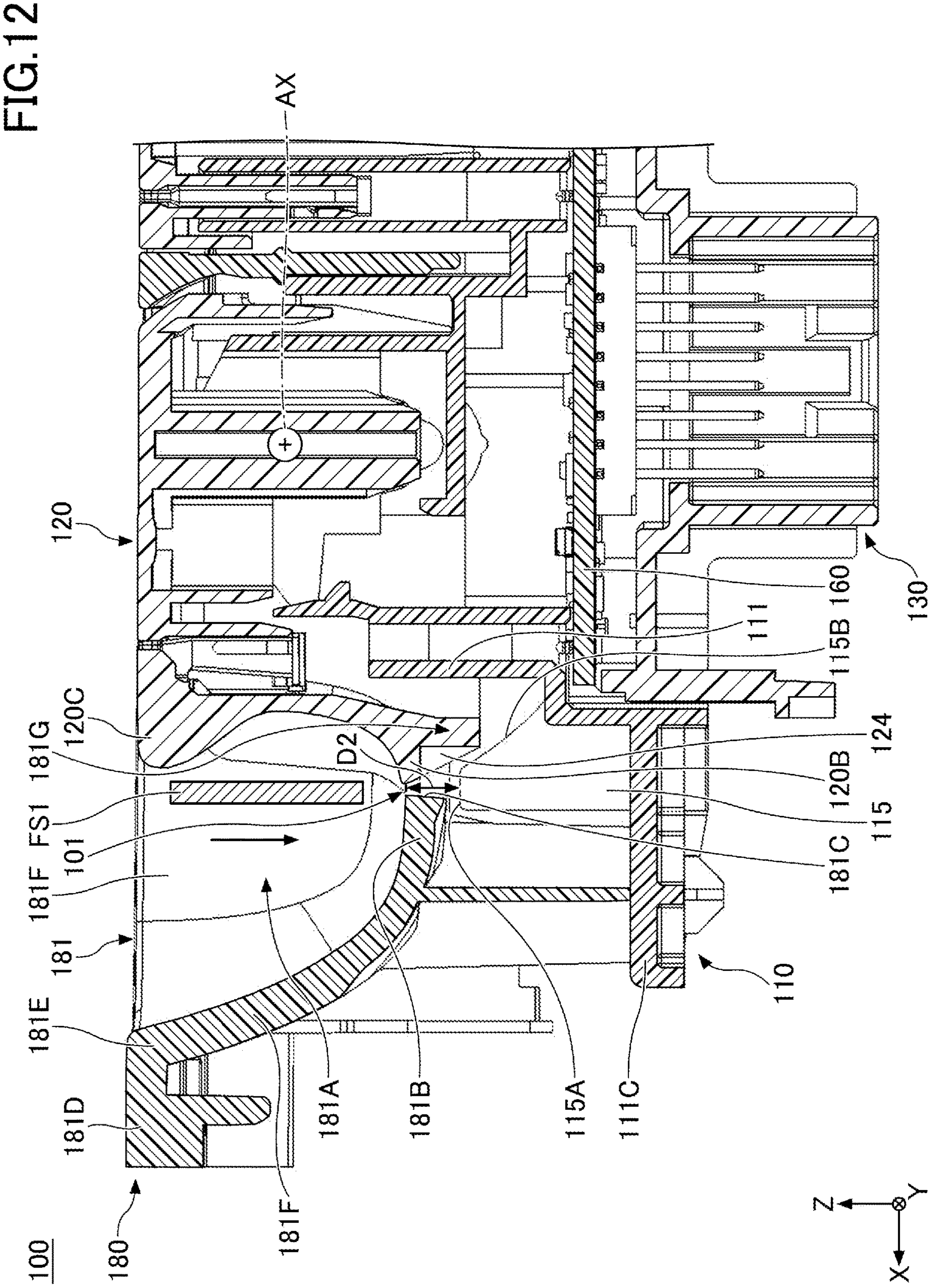
FIG. 12 is a cross-sectional view of the input device according to one embodiment and large-diameter foreign matter entering an insertion space in the device taken along the cross-sectional line D-D in the same manner as in FIG. 12.
Figure 13:
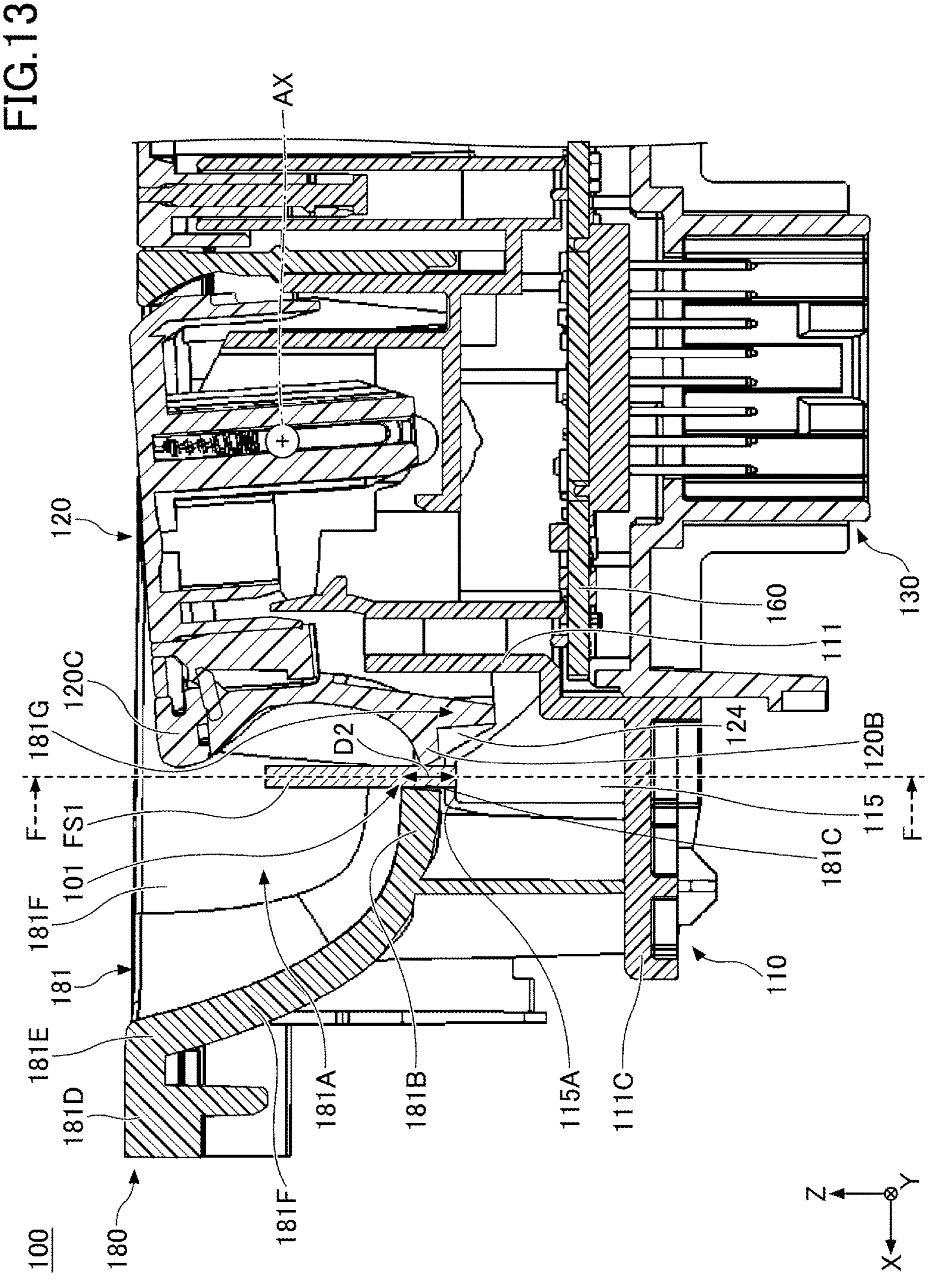
FIG. 13 is a diagram explaining an effect of the input device according to one embodiment on the large-diameter foreign matter.
Figure 14:
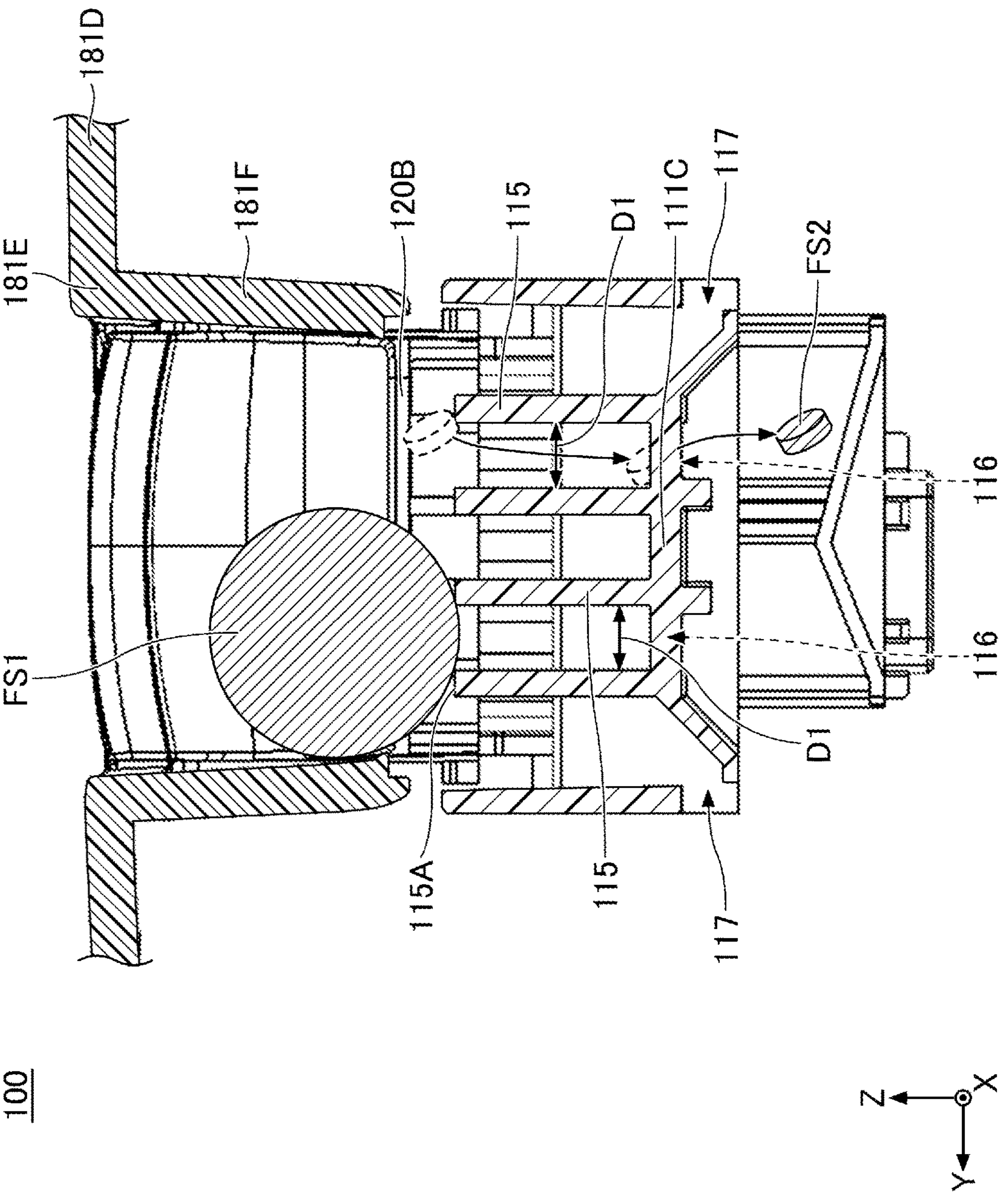
FIG. 14 is a cross-sectional view of the input device according to one embodiment taken along a cross-sectional line F-F shown in FIG. 13.
Figure 15:
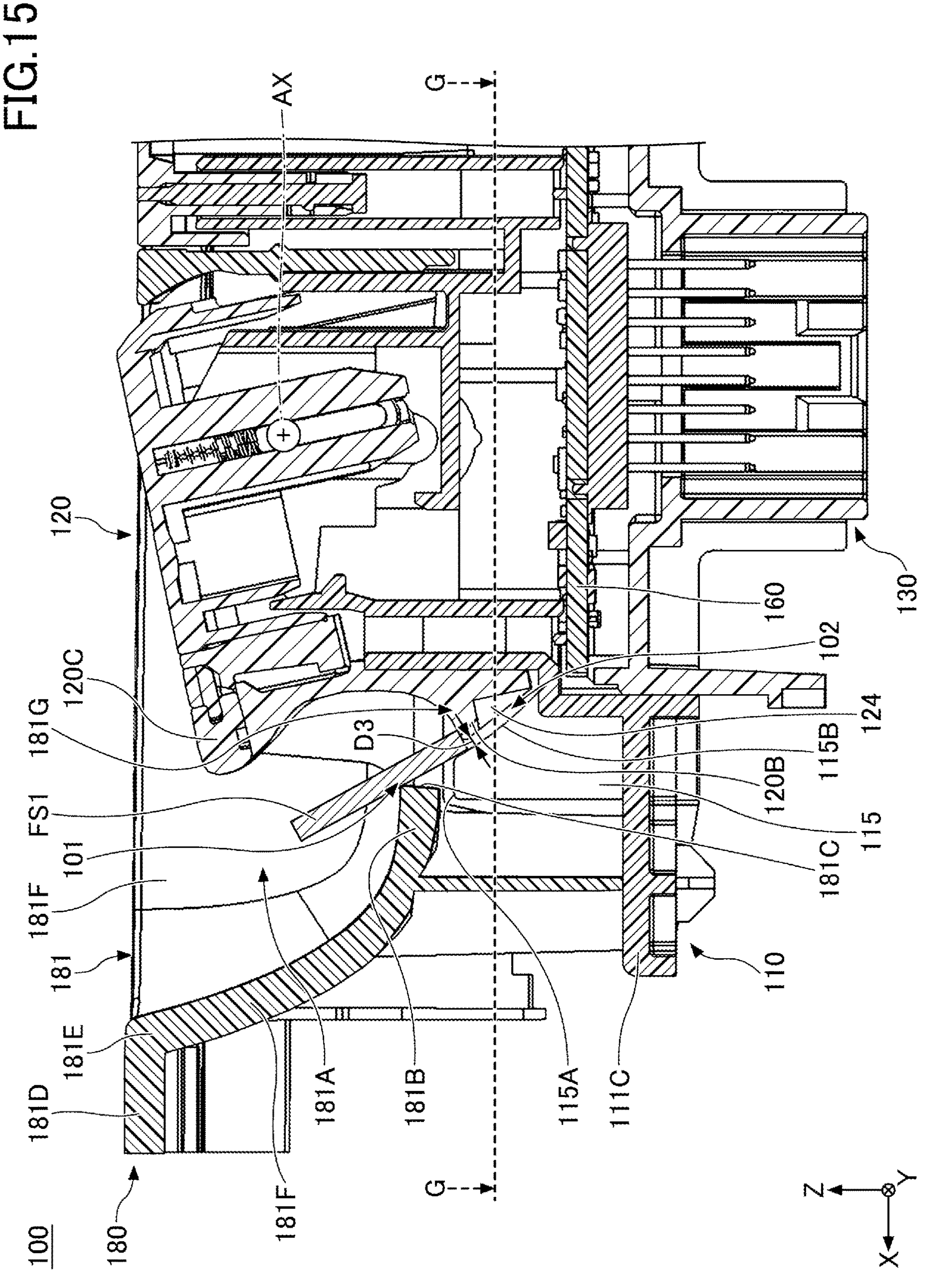
FIG. 15 is a diagram explaining a position and dimensions of a second gap of the input device according to one embodiment.
Figure 16:
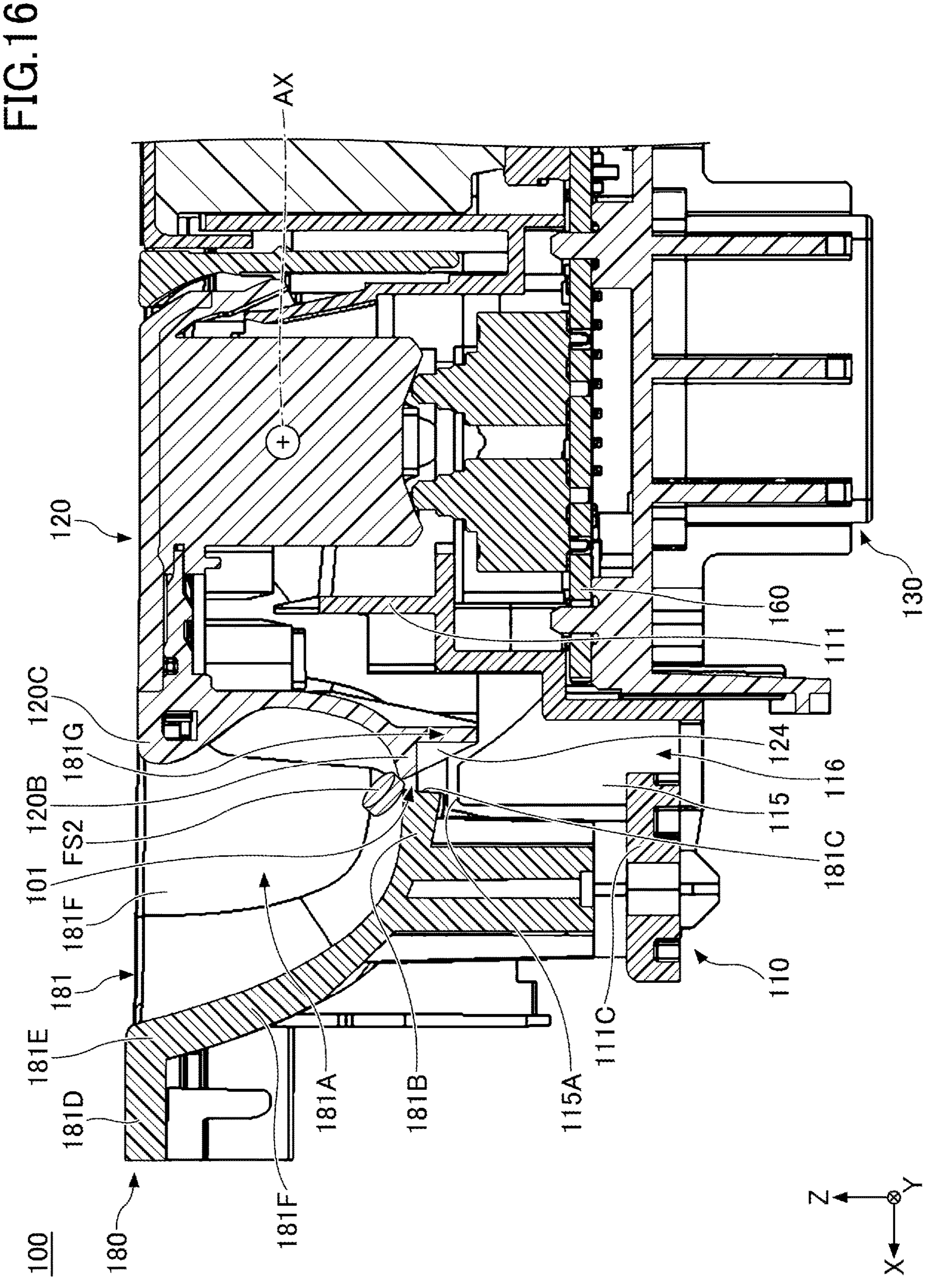
FIG. 16 is a diagram explaining the input device according to one embodiment and a state in which tablet-type foreign matter entering the insertion space falls near the gap.
Figure 17:
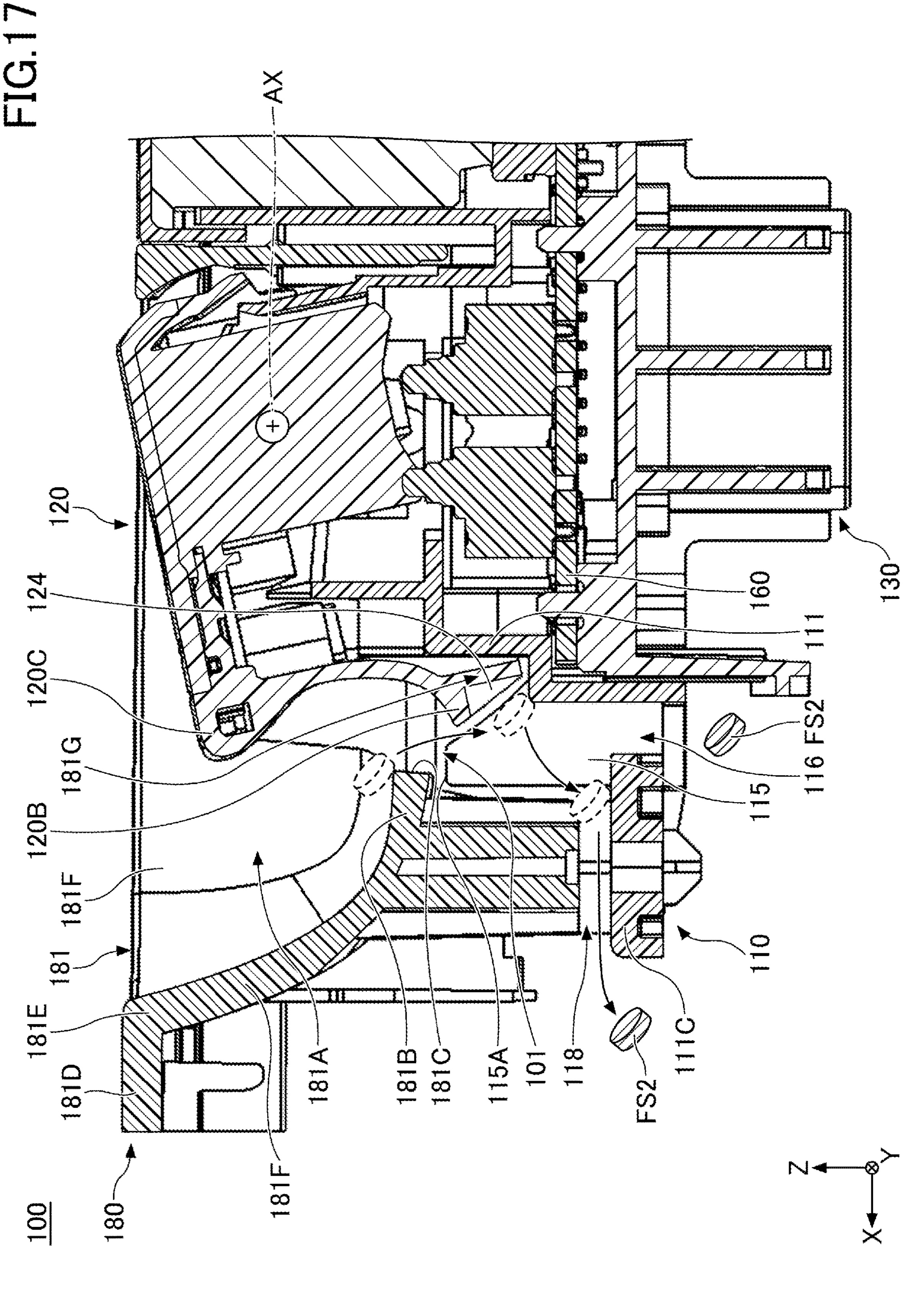
FIG. 17 is a diagram explaining an effect of the input device according to one embodiment on the tablet-type foreign matter.
Figure 18:
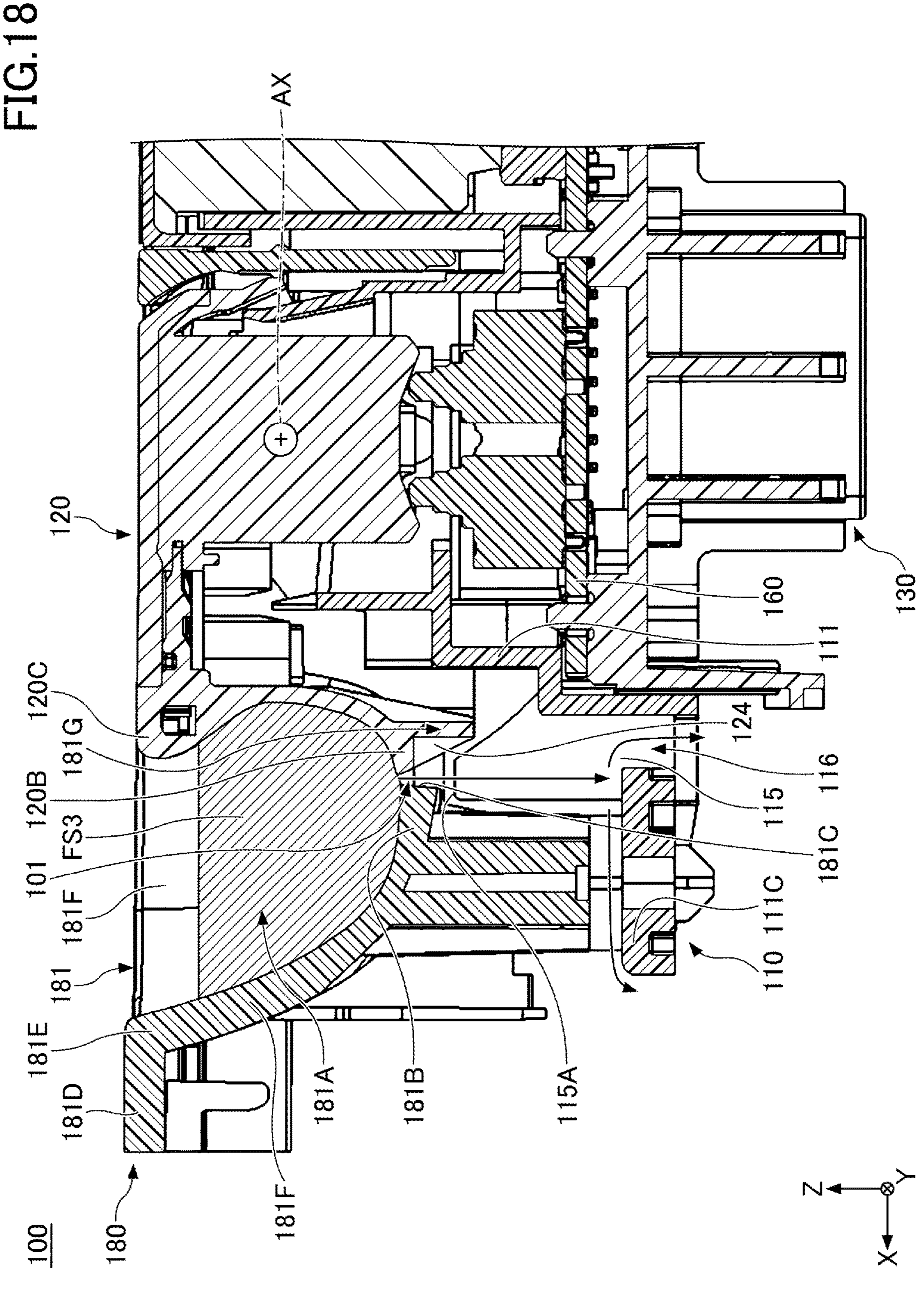
FIG. 18 is a diagram explaining the input device according to one embodiment and a state in which liquid-type foreign matter is poured into the insertion space.
Figure 19:
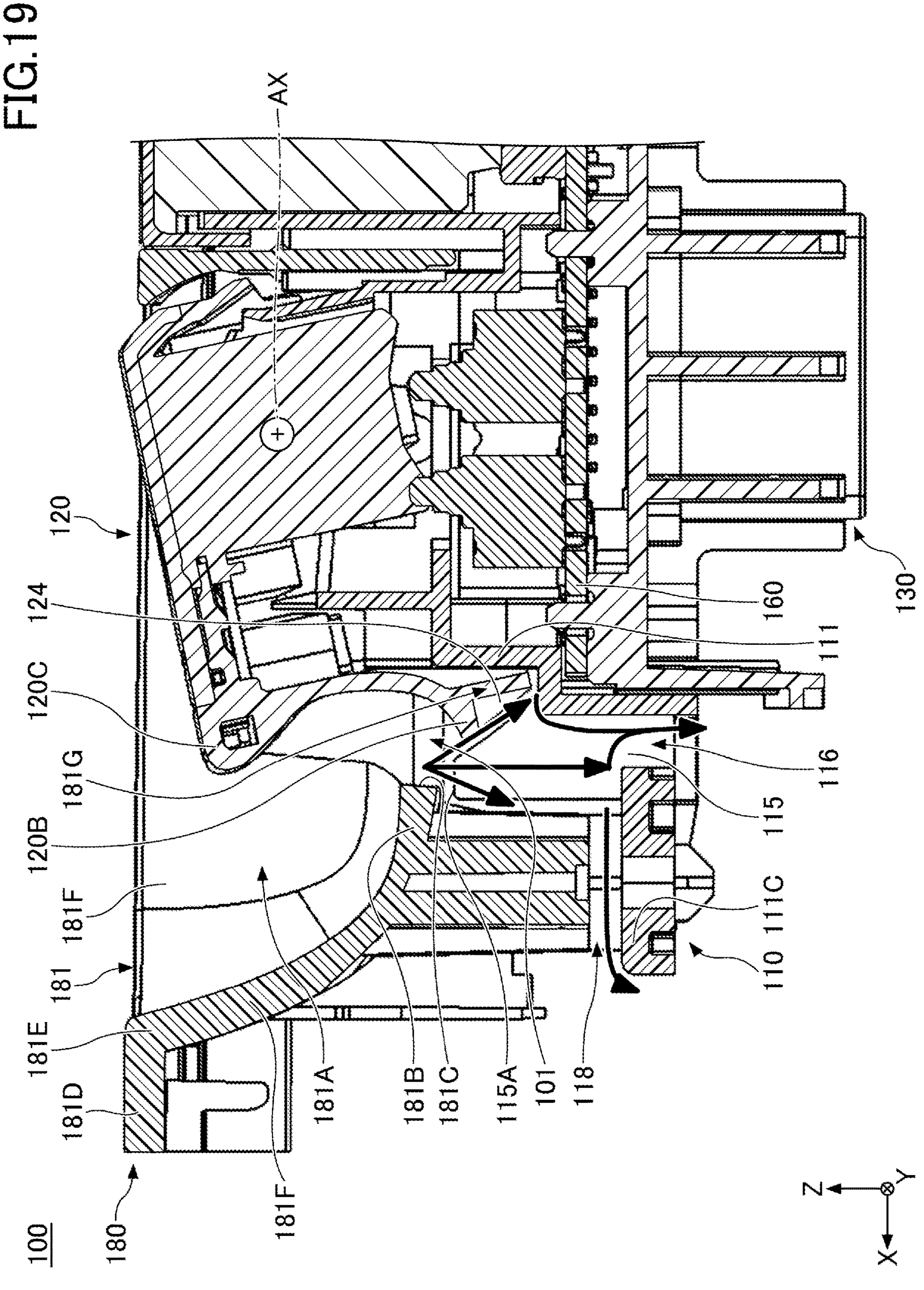
FIG. 19 is a diagram explaining an effect of the input device according to one embodiment on the liquid-type foreign matter.
Figure 20:
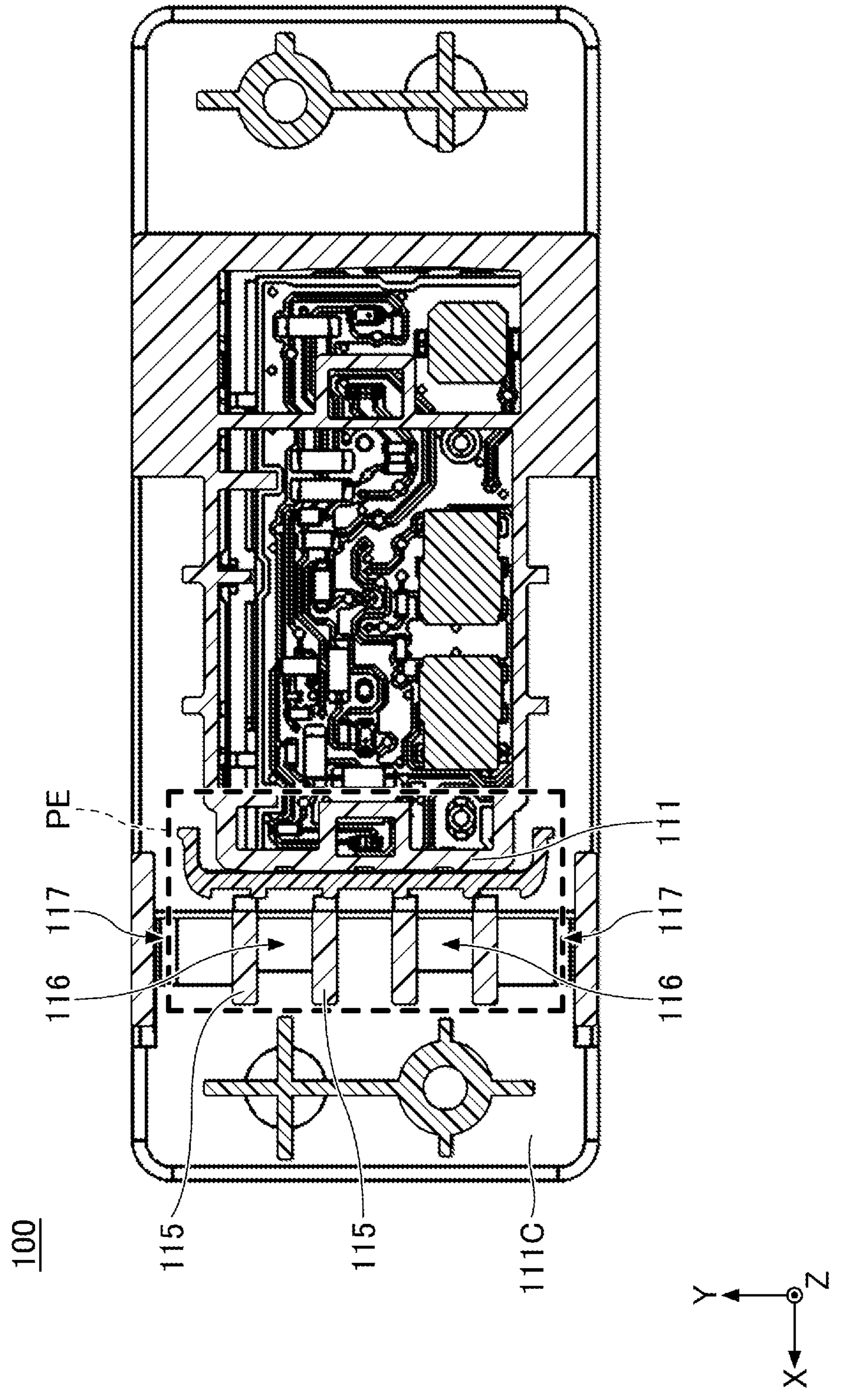
FIG. 20 is a cross-sectional view of the input device according to one embodiment taken along a cross-sectional line G-G shown in FIG. 15, in a driving state in which the operation knob is swung.
Figure 21:
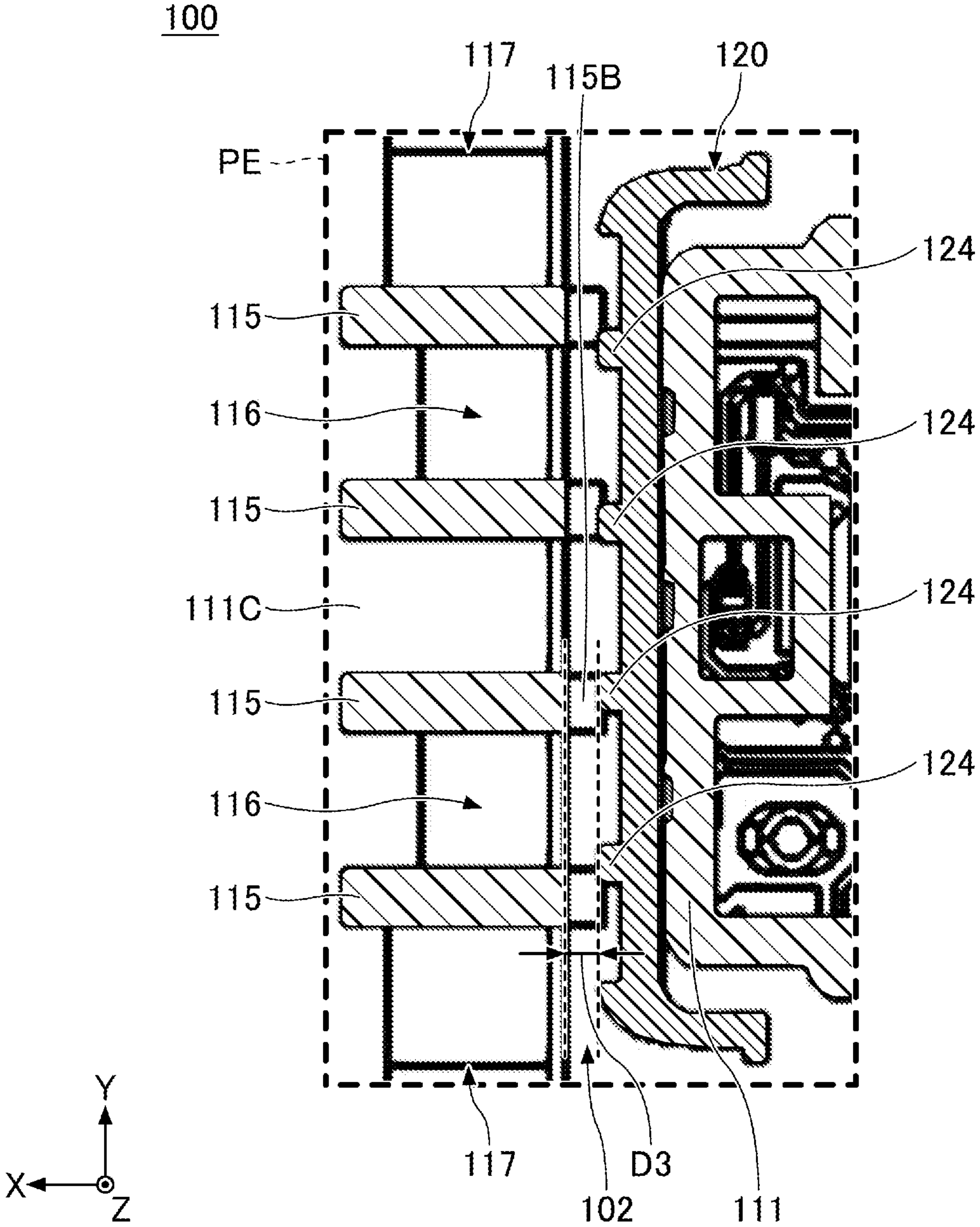
FIG. 21 is a partial enlarged view of the input device according to one embodiment, in which a portion PE shown in FIG. 20 is enlarged.
Figure 22:
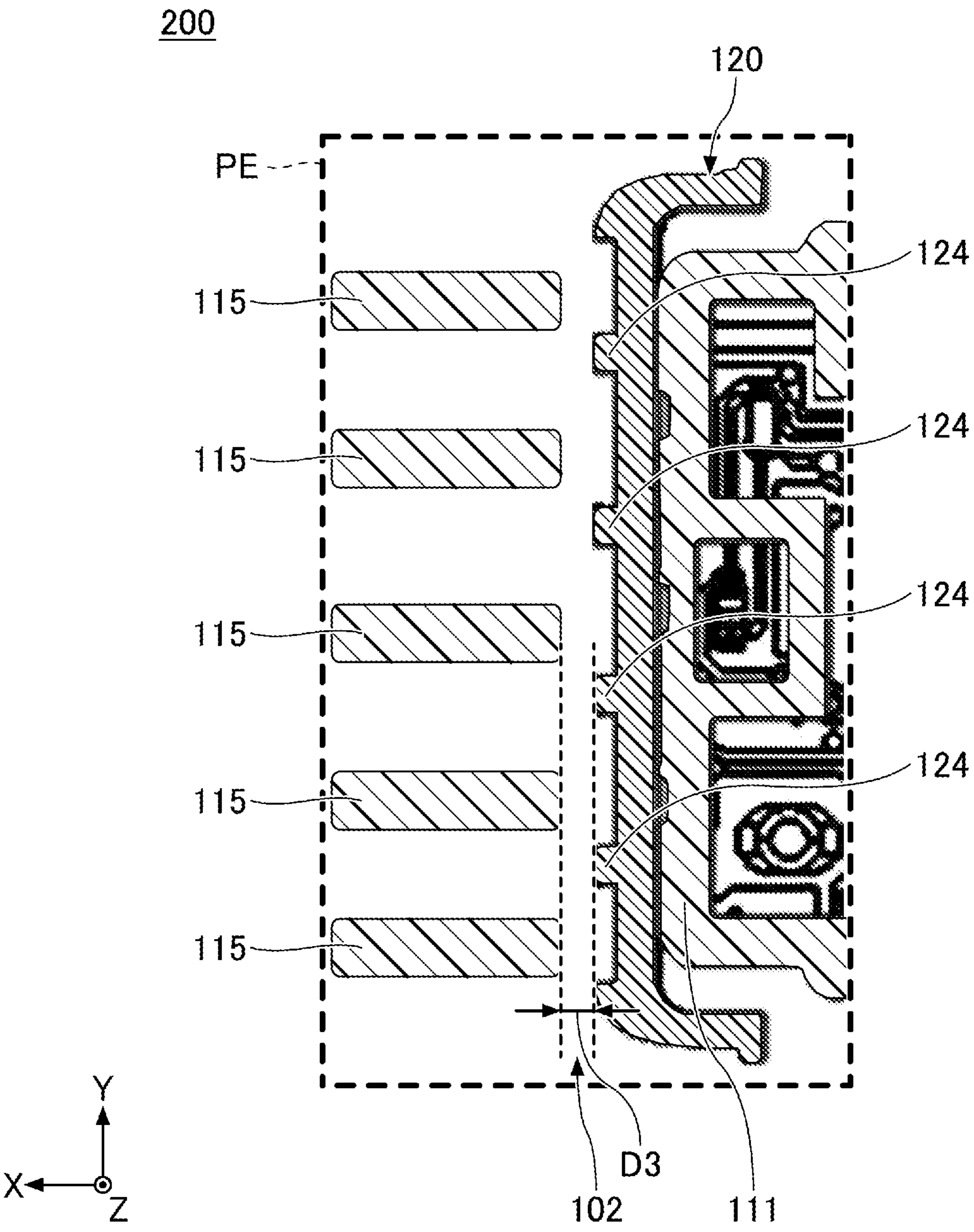
FIG. 22 is a partial enlarged view of the input device according to a first modified example.
Figure 23:
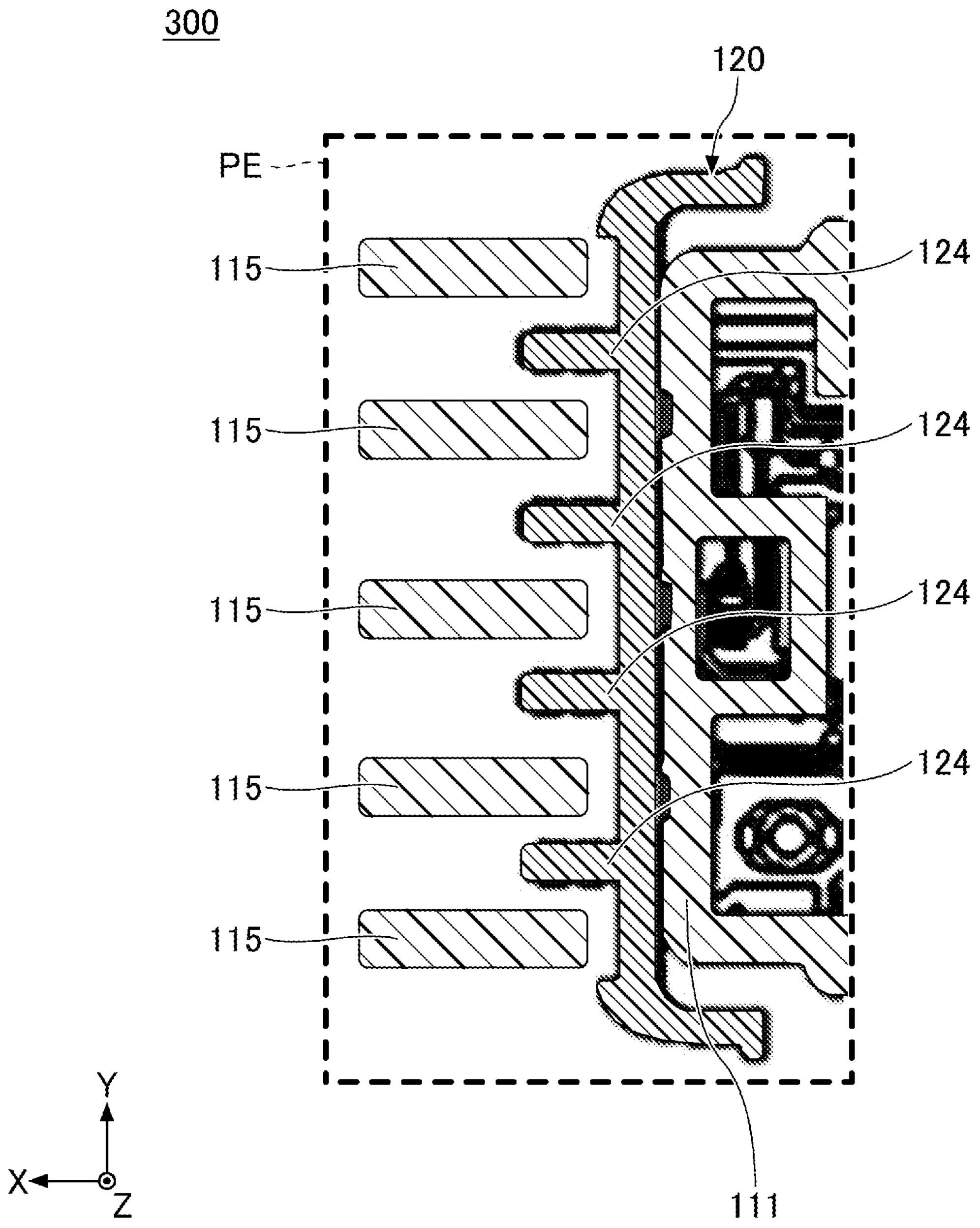
FIG. 23 is a partial enlarged view of the input device according to a second modified example.
Figure 24:
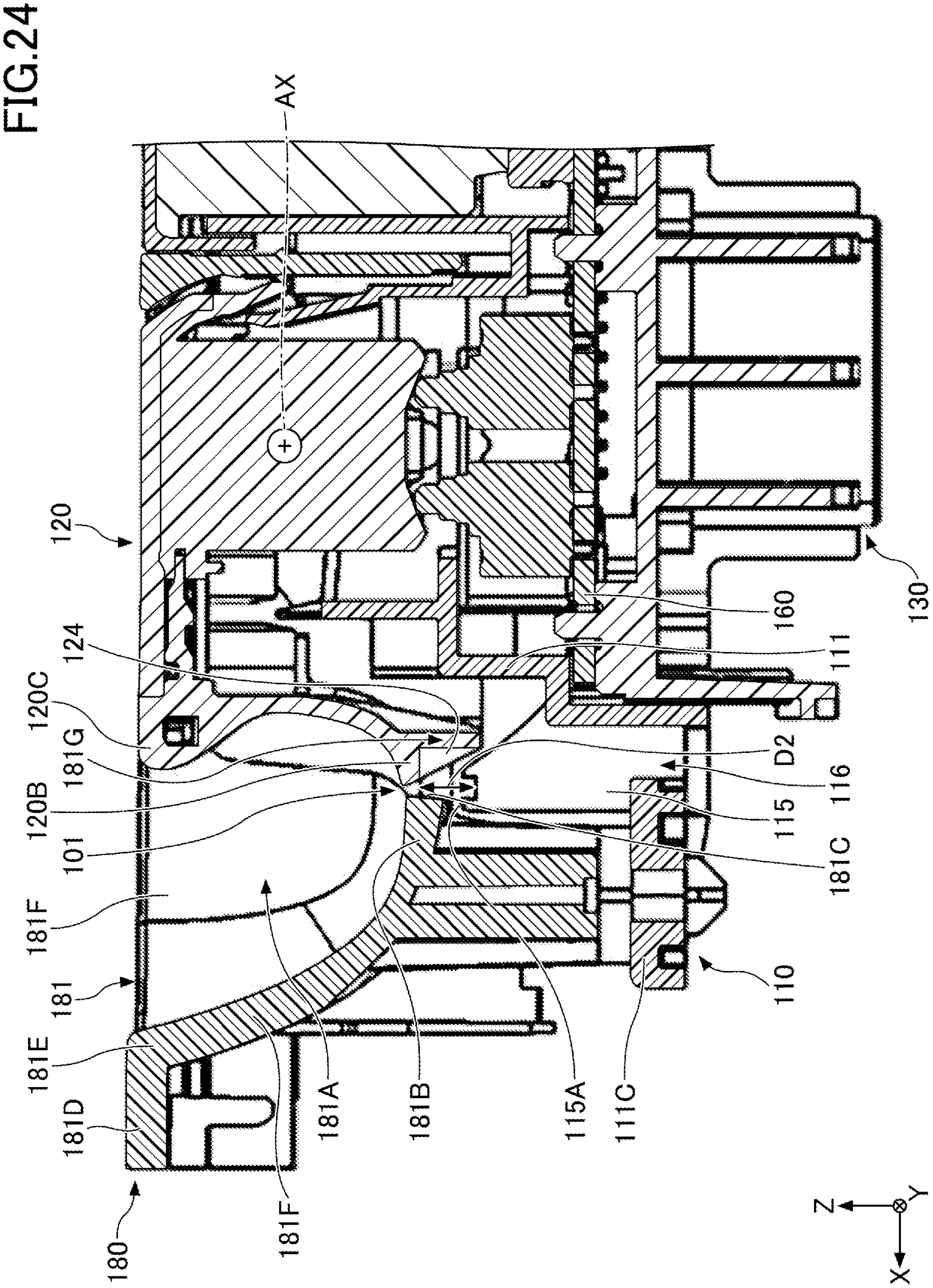
FIG. 24 is a cross-sectional view showing an upper end portion shape of the input device according to a third modified example.
Figure 25:
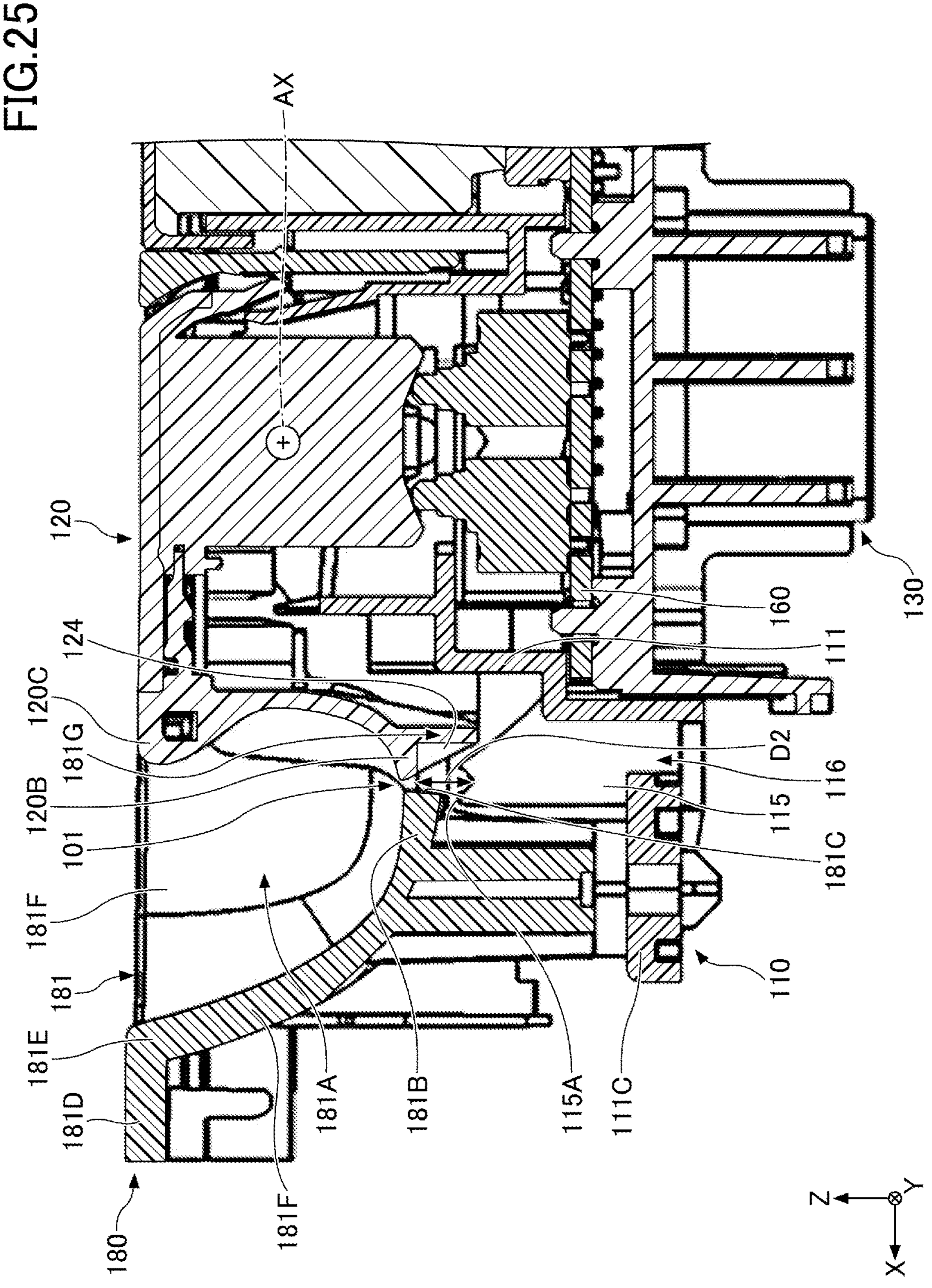
FIG. 25 is a cross-sectional view showing an upper end portion shape of the input device according to a fourth modified example.

FIG. 9 is a plan view of the input device 100 according to one embodiment. FIG. 10 is a perspective cross-sectional view of the input device 100 according to one embodiment taken along the cross-sectional line C-C shown in FIG. 9. FIG. 11 is a cross-sectional view of the input device 100 according to one embodiment taken along the line D-D shown in FIG. 9. FIG. 12 is a cross-sectional view of the input device 100 according to one embodiment and the large-diameter foreign matter FS1 entering the insertion space 181A in the device taken along the cross-sectional line D-D in the same manner as in FIG. 12. FIG. 13 is a diagram explaining an effect of the input device 100 according to one embodiment on the large-diameter foreign matter FS1. FIG. 14 is a cross-sectional view of the input device 100 according to one embodiment taken along the line F-F shown in FIG. 13. FIG. 15 is a diagram illustrating a position and dimensions of a second gap 102 of the input device 100 according to one embodiment. FIG. 16 is a diagram explaining the input device 100 according to one embodiment and a state in which the tablet-type foreign matter FS2 entering the insertion space 181A in the device falls near a gap 101. FIG. 17 is a diagram explaining an effect of the input device 100 according to one embodiment on the tablet-type foreign matter FS2. FIG. 18 is a diagram explaining the input device 100 according to one embodiment and a state in which the liquid-type foreign matter FS3 is poured into the insertion space 181A in the device. FIG. 19 is a diagram explaining an effect of the input device 100 according to one embodiment on the liquid-type foreign matter FS3. FIG. 20 is a cross-sectional view of the input device 100 according to one embodiment taken along the cross-sectional line G-G shown in FIG. 15, in a driving state in which the operation knob 120 is swung. FIG. 21 is a partial enlarged view of the input device 100 according to one embodiment, in which the portion PE shown in FIG. 20 is enlarged. FIG. 22 is a partial enlarged view of an input device 200 according to a first modified example, in which the portion PE shown is enlarged in the same manner as in FIG. 21. FIG. 23 is a partial enlarged view of an input device 300 according to a second modified example, in which the portion PE is enlarged in the same manner as in FIG. 21. FIG. 24 is a cross-sectional view showing a shape of an upper end portion 115A of the input device according to a third modified example. FIG. 25 is a cross-sectional view showing a shape of the upper end portion 115A of the input device according to a fourth modified example.

As shown in FIGS. 9 to 11, the operation knob 120 has, at the end portion on the front side (X-axis positive side) thereof, a swing end 120B that is swung about the rotation axis AX. The swing end 120B is a portion disposed below the operation portion 120C in the neutral state. In the present embodiment, the swing end 120B is formed parallel to the Y-axis direction. When the operation knob 120 is viewed from the Y-axis direction, the swing end 120B has a shape that is formed at the furthest position (an example of a "predetermined distance") from the cylindrical portions 111A constituting the rotation axis AX in the operation knob 120. The swing end 120B is an example of a "swing end".

As shown in FIGS. 9, 11, and 12, the console panel 180 has the fixed end 181C disposed at an end portion on the rear side (X-axis negative side) of the bottom wall portion 181B of the insertion space 181A such that the fixed end 181C faces the swing end 120B of the operation knob 120 in the neutral state in which the operation knob 120 is not operated. The fixed end 181C of the console panel 180 is formed in a shape parallel to the Y-axis direction. In the present embodiment, the swing end 120B and the fixed end 181C are formed parallel to the Y-axis direction, however, these ends may have any shape as long as they are positioned opposite each other and shaped to allow the operation knob 120 to be swung. For example, the swing end 120B and the fixed end 181C may have a shape (not illustrated) having a wavy curved surface that is not parallel to the Y-axis direction. Further, for example, the swing end 120B and the fixed end 181C may have a shape (not illustrated) having an inclined surface part that obliquely intersects the Y-axis direction. The fixed end 181C is an example of a "fixed end".

As shown in FIGS. 9, 11, and 12, the gap 101 is formed between the swing end 120B of the operation knob 120 and the fixed end 181C of the console panel 180. It is preferable that the width of the gap 101 is set to be smaller than the thickness of a coin having the smallest dimension among many circulating coins. When the size of the gap 101 is set to be smaller than the thickness of the coin, as shown in FIG. 12, even if the large-diameter foreign matter FS1 entering the insertion space 181A approaches and comes into contact with the gap 101, the possibility that the large-diameter foreign matter FS1 is caught in the gap 101 is reduced. In the present embodiment, the width of the gap 101 between the swing end 120B and the fixed end 181C is set to 1.17 mm. The gap 101 is an example of a “gap”.

Further, the case 110 includes four (an example of “plural”) of the protrusions 115 provided below the gap 101 (in the Z-axis negative direction). In combination with the gap 101, the protrusions 115 are shaped to act as a sort of filter. Each of the protrusions 115 has a shape extending from the wall portion 111 and the base portion 111C toward the gap 101. The protrusion 115 also has the surface (upper end portion 115A) facing the gap 101 on the lower side of the gap 101. Although the protrusion 115 is formed to fit the shape of the case 110 in the present embodiment, the protrusion 115 may be formed as a part of the console panel 180, for example. As shown in FIGS. 9 and 11, the protrusions 115 overlap the gap 101 when viewed from the Z-axis direction (the first direction perpendicular to the substrate 160) in plan view, in the neutral state in which the operation knob 120 is not operated. In a case where this condition is satisfied, as shown in FIG. 13, even when the operation knob 120 is swung and the size of the gap 101 increases, and the large-diameter foreign matter FS1 is caught in the gap 101 and falls, the matter comes into contact with the upper end portions 115A of the protrusions 115 and stops. The operation knob 120 shown in FIG. 13 is located at the position rotated by 5° from the position of the knob in the neutral state. When the upper part of the large-diameter foreign matter FS1 is exposed above the gap due to the contact with the protrusions 115, the operator can easily remove the large-diameter foreign matter FS1. In the present embodiment, when viewed from the Z-axis direction (the first direction perpendicular to the substrate 160) in plan view, the protrusion 115 and the gap overlap each other to connect the entire gap from end to end in the X-axis direction. However, as long as the protrusions 115 and the gap 101 are configured such that the large-diameter foreign matter FS1 that has fallen into the gap 101 comes into contact with and stops at the upper end portions 115A, the protrusions 115 and the gap 101 may only partially overlap each other. The upper end portion 115A is an example of an “upper end portion”.

It is preferable that a distance D2 from the upper side of the gap 101 to the upper end portion 115A is set to be smaller than the diameter of a coin having the smallest dimension among many circulating coins. The distance D2 from the gap 101 to the upper end portion 115A is preferably set to be smaller than 16.25 mm. In the present embodiment, the distance D2 from the gap 101 to the upper end portion 115A is set to 4.10 mm.

As illustrated in FIG. 15, the input device 100 according to one embodiment may include the second gap 102 between a facing surface 115B of the protrusion 115 and the swing end 120B. In the case where the second gap 102 is provided, when the operation knob 120 is swung, there is less possibility that the swing of the operation knob 120 is hindered by the operation knob 120 coming into contact with the protrusions 115. Further, to prevent the large-diameter foreign matter FS1 from being caught in the second gap 102, it is preferable that a gap width D3 of the second gap 102 is set to be smaller than the thickness of a coin having the smallest thickness among many circulating coins when viewed from the Z-axis direction in plan view. The gap width D3 of the second gap 102 is preferably smaller than 1.5 mm. In the present embodiment, the gap width D3 of the second gap 102 is set to 1.35 mm. As a result, it reduces the possibility that the large-diameter foreign matter FS1 that has fallen into the insertion space 181A is caught in the second gap 102.

Therefore, in the input device 100 according to one embodiment, the operator can easily remove the large-diameter foreign matter FS1 that has entered the gap 101. It is also possible to reduce the possibility that the swing of the operation knob 120 is inhibited in a manner in which it is difficult to recover due to the influence of the large-diameter foreign matter FS1.

As shown in FIGS. 6 and 16 to 20, the case 110 has through holes 116 which are adjacent to a portion on the lower side of the protrusions 115 formed to penetrate the base portion 111C in the up-down direction. As shown in FIGS. 14 and 20, the case 110 also has through holes 117 formed in the base portion 111C adjacent to the portion on the lower side of the protrusions 115 and formed in an oblique direction intersecting the Z-axis direction, when viewed from the X-axis direction. Furthermore, as shown in FIG. 17, the case 110 has a hole 118 that is formed through the space between the plurality of protrusions 115 in the X-axis positive direction. The through holes 116 and 117 are discharge holes for dropping and discharging foreign matter having small anisotropic properties and small dimensions such as the tablet-type foreign matter FS2 and the liquid-type foreign matter FS3 to the lower side of the input device 100. The hole 118 is a discharge hole through which the tablet-type foreign matter FS2 that has passed through and dropped from the protrusions 115 and the liquid-type foreign matter FS3 are discharged toward the front of the input device 100. The through holes 116 and 117 and the hole 118 are formed to be larger than the size of the tablet-type foreign matter FS2 so that the tablet-type foreign matter FS2 can pass through. Further, as illustrated in FIGS. 9, and 14, the case 110 includes the plurality of protrusions 115 (in the present embodiment, four as an example) provided in a comb-like shape arranged in the left-right direction (Y-axis direction). The plurality of protrusions 115 are provided to be separated from each other by a predetermined interval D1. The predetermined interval D1 is an example of a “predetermined interval”. When viewed from the Z-axis direction, the through holes 116 are provided between the plurality of protrusions 115. As shown in FIG. 14, the through holes 117 are provided near the corresponding outermost protrusion 115 among the plurality of protrusions.

As shown in FIGS. 13 to 15, the input device 100 according to one embodiment can stop the large-diameter foreign matter FS1 within the gap 101. As a result, the large-diameter foreign matter FS1 can be easily picked up and removed, and the possibility that the operation knob 120 is stuck in a manner in which it is difficult to recover and it becomes difficult to perform the input operation on the operation knob 120 is reduced. Accordingly, as illustrated in FIGS. 16 to 19, the input device 100 according to one embodiment can discharge the tablet-type foreign matter FS2 and the liquid-type foreign matter FS3 that have fallen into the gap 101 downward from the input device 100. This reduces the possibility that the tablet-type foreign matter FS2 is left around the operation knob 120, and thus reduces the possibility that the operation knob 120 is stuck due to the entry of the tablet-type foreign matter FS2 and it becomes difficult to perform the input operation on the operation knob 120.

In addition, since a plurality of drainage paths having wide dimensions for discharging the liquid-type foreign matter FS3 is thereby secured, even when a large amount of liquid-type foreign matter FS3 is accumulated in the insertion space 181A, the liquid-type foreign matter FS3 is easily discharged. This reduces the possibility that the liquid-type foreign matter FS3 enters the inside of the case 110 to wet the substrate 160.

Further, in the present embodiment, as shown in FIGS. 9 and 11, the protrusion 115 has a plate shape perpendicular to the substrate 160, and a plane formed by the plate shape is parallel to the Z-axis direction (the first direction perpendicular to the substrate 160) and intersects the gap 101.

As a result, in the input device 100 according to one embodiment, large-diameter foreign matter that has entered the gap 101 can be more reliably brought into contact with the protrusions 115 and can be stopped within the gap 101. In the present embodiment, when viewed from the Z-axis direction, the plane formed by the plate shaped protrusion 115 is formed in a direction orthogonal to the gap 101. When the plane formed by the plate shaped protrusion 115 and the gap 101 are disposed at an angle of intersection, it is easy to design the distance between the protrusion 115 and the position of the swing end 120B that transitions in accordance with the swing of the operation knob 120 to be small. As a result, the limiting condition for the swing range of the operation knob 120, which is required for causing the configuration combining the protrusions 115 and the gap 101 to function as a filter, is relaxed. Therefore, the cost required for designing the swing range of the operation knob 120 is reduced, and the degree of freedom of the other design is increased.

As shown in FIGS. 9 and 11, the protrusion 115 has the upper end portion 115A orthogonal to the Z-axis direction (the first direction perpendicular to the substrate 160) when viewed from the Y-axis direction (the direction parallel to the rotation axis AX). Specially in the present embodiment, the width of the upper end portion 115A in the front-rear direction (X-axis direction) is larger than the width of the gap 101 in the front-rear direction (X-axis direction), and the gap 101 falls within the width range of the upper end portion 115A in the front-rear direction (X-axis direction).

As shown in FIGS. 11 to 19, the upper end portion 115A in the present embodiment is formed in a plane shape perpendicular to the Z-axis direction, however, as shown in FIG. 24, the upper end portion 115A may have a concave shape. As shown in FIG. 25, the upper end portion 115A may also have a concave curved shape. In other words, the upper end portion 115A has a shape for coming into contact with and receiving the lower end portion of the large-diameter foreign matter FS1 falling downward from the gap 101, and for stopping the large-diameter foreign matter FS1 at a position where the operator can easily remove the large-diameter foreign matter FS1 by picking up the upper part thereof. Therefore, the upper end portion 115A only needs to have a shape that easily comes into contact with the lower part of the large-diameter foreign matter FS1 that has fallen into the gap 101 to stop the foreign matter from moving forward, and when viewed from the Y-axis direction, the upper end portion 115A is not limited to a flat shape and may have various shapes including a concave shape and a curved concave shape.

Accordingly, in the input device 100 according to one embodiment, the large-diameter foreign matter FS1 that has entered the gap 101 can be reliably received by the upper end portions 115A of the protrusions 115.

When the tablet-type foreign matter FS2 enters the insertion space 181A and falls from the gap 101, the tablet-type foreign matter FS2 passes and falls through paths indicated by arrows in FIG. 14 or 17, and is discharged to the outside of the input device 100. In order to smoothly drop the tablet-type foreign matter FS2, the predetermined interval D1 is preferably set to be larger than the diameter of the tablet-type foreign matter FS2. When this condition is satisfied, the tablet-type foreign matter FS2 that has fallen from the gap 101 rolls down between the plurality of protrusions 115 without stopping even when the foreign matter comes into contact with the upper end portions 115A. The tablet-type foreign matter FS2 that has rolled down between the plurality of protrusions 115 also passes through one of the through holes 116, 117, or the hole 118, and falls to the lower side of the input device 100. This reduces the possibility that the tablet-type foreign matter FS2 is deposited around the operation knob 120 to hinder the swing of the operation knob 120.

When the liquid-type foreign matter FS3 is poured into the insertion space 181A, the liquid-type foreign matter passes through paths indicated by arrows in FIGS. 18 and 19, and is discharged to the outside of the input device 100.

As an example, the predetermined interval D1 is preferably greater than 0.5 mm and smaller than 16.25 mm. In the present embodiment, the predetermined interval D1 is set to 4.3 mm. It is preferable that the predetermined interval D1 is set to be smaller than the diameter of a coin having the smallest dimension among many circulating coins. For this reason, the predetermined interval D1 is preferably smaller than 16.25 mm. When a resin molded body having the high dimensional accuracy is formed using a mold, an insert is used. When a shape having a comb-tooth shape such as the protrusions 115 is formed by using an insert, a practical lower limit value of an interval of the comb teeth is 0.5 mm due to a limit of physical strength of the insert. If the interval of the comb teeth is set smaller than or equal to 0.5 mm, the insert is likely to be broken in the resin-molding process for forming the case 110. Further, if a comb-tooth shape with intervals smaller than or equal to 0.5 mm is formed while protecting the insert by adjusting the injection speed and the forming pressure during the resin-forming, the strength of the resulting resin-formed body becomes unstable, which is not realistic. Therefore, it is preferable that the predetermined interval D1 is greater than or equal to 0.5 mm.

In the present embodiment, as shown in FIGS. 10 to 12 and 21, the operation knob 120 includes the plurality of ribs 124 disposed on the X-axis negative side of the plurality of protrusions 115 to face each of the plurality of protrusions 115. For example, in the present embodiment, the operation knob 120 includes the four ribs 124 disposed to face the four respective protrusions 115.

Accordingly, in the input device 100 according to one embodiment, a space serving as a passage is formed by two adjacent protrusions 115 and two adjacent ribs 124 facing thereto. The through holes 116 and 117 are disposed below the passage. According to this configuration, since the passage and the through holes 116 and 117 are directly connected, even when a large amount of tablet-type foreign matter FS2 or liquid-type foreign matter FS3 falls from the gap 101, the foreign matter can be smoothly discharged.

In the present embodiment, each of the plurality of ribs 124 is disposed at the same position as a corresponding protrusion 115 of the plurality of protrusions 115 in the Y-axis direction (the axial direction of the rotation axis AX). However, it is not limited thereto, and for example, as in the first modified example illustrated in FIG. 22, each of the plurality of ribs 124 may be disposed to be offset from the corresponding protrusion 115 of the plurality of protrusions 115 in the Y-axis direction (the axial direction of the rotation axis AX). That is, the protrusions 115 and the ribs 124 may be alternately arranged in the Y-axis direction (the axial direction of the rotation axis AX).

In the first modified example, the gap width D3 of the second gap 102 is preferably smaller than 1.5 mm. Accordingly, the input device 100 according to one embodiment can more reliably prevent the large-diameter foreign matter FS1 from falling. Further, according to the configuration of the first modified example, even if the dimensional accuracy between the protrusion 115 and the rib 124 is poor, the possibility that the protrusion 115 and the rib 124 collide with each other and the swing of the operation knob 120 is inhibited is reduced. Therefore, the manufacturing cost can be reduced.

Furthermore, as in the second modified example illustrated in FIG. 23, each of the plurality of ribs 124 may be formed to enter between at least two protrusions of the plurality of protrusions 115 in the driving state in which the operation knob 120 is swung. According to the configuration of the second modified example, it is possible to eliminate the possibility that the large-diameter foreign matter FS1 is caught between the protrusions 115 and the ribs 124.

As a result, the input device 100 according to one embodiment can prevent a coin entering the gap 101 from falling from the gap 101 even when the coin is any one of a one-yen coin (20.0 mm diameter, 1.5 mm thick), one-cent coin (19.05 mm diameter, 1.55 mm thick), one-cent-euro coin (16.25 mm diameter, 1.67 mm thick), and one-yuan coin (25 mm diameter, 1.85 mm thick).

In the present embodiment, the case 110 and the console panel 180 are formed as separate members at the time of manufacturing, and are assembled in the assembly process. However, such a manner is not limited to the above embodiment, and the case 110 and the console panel 180 may be integrally formed at the time of manufacturing.

Although one embodiment of the present disclosure has been described in detail above, the present disclosure is not limited to one embodiment, and various modifications or changes can be made within the scope of the present disclosure.

In an input device according to one embodiment, it is possible to reduce possibility that the swing of the operation knob is inhibited in a manner in which it is difficult to recover due to the influence of the foreign matter.

What is claimed is:

1. An input device comprising:

a substrate;

a case configured to accommodate the substrate;

an operation knob swingably supported by the case and configured to be operated by an operator; and a panel member having an opening allowing swing of the operation knob, at least a part of the opening being closed by the operation knob, wherein the operation knob includes a swing end formed at a predetermined distance from a rotation axis that serves as a rotation center when the operation knob is swung, wherein the panel member includes a fixed end that defines one end of the opening and that faces the swing end of the operation knob in a neutral state in which no operation is performed by the operator, wherein the swing end and the fixed end form a gap therebetween, wherein the case includes a protrusion that protrudes toward the gap on a lower side of the gap, at least a part of the protrusion overlaps the gap when viewed from a first direction perpendicular to the substrate in the neutral state in plan view, and said at least the part of the protrusion is located closer to the fixed end relative to the swing end, wherein a plurality of protrusions are provided to be spaced apart from each other at a predetermined interval when viewed from the first direction in plan view, and wherein the operation knob includes a plurality of ribs arranged to face the plurality of protrusions.

2. The input device according to claim 1, wherein the protrusion has a plate shape, and a plane formed by the plate shape is parallel to the first direction and intersects with the gap.

3. The input device according to claim 1, wherein the protrusion includes an upper end portion facing the gap on the lower side of the gap.

4. The input device according to claim 3, wherein the upper end portion is orthogonal to the first direction.

5. The input device according to claim 3, wherein a distance from an upper side of the gap to the upper end portion in the first direction is smaller than 16.25 mm.

6. The input device according to claim 1, wherein the predetermined interval is greater than 0.5 mm and smaller than 16.25 mm.

7. The input device according to claim 1, wherein each of the plurality of ribs is disposed at a same position as a corresponding protrusion of the plurality of protrusions in an axial direction of the rotation axis.

8. The input device according to claim 1, wherein each of the plurality of ribs is arranged to be offset from a corresponding protrusion of the plurality of protrusions in the axial direction of the rotation axis.

9. The input device according to claim 8, wherein each of the plurality of ribs is configured to enter between at least two protrusions of the plurality of protrusions in a driving state in which the operation knob is swung.

10. The input device according to claim 1, wherein a second gap is provided between a facing surface of the protrusion and the swing end in a driving state in which the operation knob is swung, and the second gap has a width smaller than 1.5 mm.

11. The input device according to claim 1, wherein the at least the part of the protrusion continuously extends from the fixed end to the swing end in plan view.

* * * * *